(12) United States Patent
Sacre et al.

(10) Patent No.: US 7,896,504 B2
(45) Date of Patent: Mar. 1, 2011

(54) PROJECTION MODULE AND PROJECTOR INCORPORATING SAME

(75) Inventors: Jean-Jacques Sacre, Chateaugiron (FR); Pascal Benoit, Liffre (FR)

(73) Assignee: Thomson Licensing, Boulonge-Billancourt (FR)

( * ) Notice: Subject to any disclaimer, the term of this patent is extended or adjusted under 35 U.S.C. 154(b) by 593 days.

(21) Appl. No.: 10/594,867

(22) PCT Filed: Mar. 30, 2005

(86) PCT No.: PCT/EP2005/051432

§ 371 (c)(1),
(2), (4) Date: Sep. 28, 2006

(87) PCT Pub. No.: WO2005/096094

PCT Pub. Date: Oct. 13, 2005

(65) Prior Publication Data

US 2007/0216877 A1 Sep. 20, 2007

(30) Foreign Application Priority Data

Mar. 30, 2004 (FR) ................................. 04 03335
Dec. 3, 2004 (FR) ................................. 04 12904

(51) Int. Cl.
*G03B 21/22* (2006.01)
*G03B 21/28* (2006.01)

(52) U.S. Cl. ............................ 353/78; 353/51; 353/74; 353/77

(58) Field of Classification Search ............. 353/74–78, 353/119, 97–99, 122, 37, 48, 50–51, 73; 359/460, 850, 727, 730; 348/745, 781, 744, 348/782–783
See application file for complete search history.

(56) References Cited

U.S. PATENT DOCUMENTS

| 4,129,364 | A | 12/1978 | Dietz |
| 5,108,172 | A * | 4/1992 | Flasck ..................... 353/31 |
| 5,716,118 | A | 2/1998 | Sato et al. |
| 6,233,024 | B1 | 5/2001 | Hiller et al. |

(Continued)

FOREIGN PATENT DOCUMENTS

DE 19737861 3/1999

(Continued)

OTHER PUBLICATIONS

Search Report Dated Jul. 8, 2005.

*Primary Examiner*—Georgia Y Epps
*Assistant Examiner*—Jori S Reilly-Diakun
(74) *Attorney, Agent, or Firm*—Robert D. Shedd; Harvey D. Fried; Patricia Verlangieri

(57) ABSTRACT

A projection module intended to project an image on a screen defining a specified projection plane is disclosed. The module includes an objective, for emitting an imaging beam; a curved mirror; and at least two deflection surfaces for deflecting the imaging beam, the deflection surfaces being placed in the path of the imaging beam between the objective and the curved mirror.

5 Claims, 16 Drawing Sheets

U.S. PATENT DOCUMENTS

| | | | |
|---|---|---|---|
| 6,406,150 B1 * | 6/2002 | Burstyn | 353/69 |
| 6,626,541 B2 * | 9/2003 | Sunaga | 353/69 |
| 6,752,500 B1 * | 6/2004 | Yoshii et al. | 353/78 |
| 7,048,388 B2 * | 5/2006 | Takaura et al. | 353/99 |
| 7,467,872 B2 * | 12/2008 | Hisada et al. | 353/77 |
| 7,488,077 B2 * | 2/2009 | Sarayeddine et al. | 353/77 |
| 7,503,661 B2 * | 3/2009 | Masubuchi et al. | 353/99 |
| 7,714,943 B2 * | 5/2010 | Bassi et al. | 348/744 |
| 2001/0050758 A1 * | 12/2001 | Suzuki et al. | 353/69 |
| 2002/0057421 A1 | 5/2002 | Kurematsu et al. | |
| 2002/0181130 A1 | 12/2002 | Ohzawa | |
| 2003/0011753 A1 * | 1/2003 | Sakata et al. | 353/74 |
| 2003/0090794 A1 * | 5/2003 | Chatani et al. | 359/449 |
| 2003/0231261 A1 * | 12/2003 | Bassi et al. | 348/745 |

FOREIGN PATENT DOCUMENTS

| | | |
|---|---|---|
| EP | 1203977 | 5/2002 |
| JP | 7-84813 | 3/1995 |

* cited by examiner

PROJECTION MODULE AND PROJECTOR INCORPORATING SAME

This application claims the benefit, under 35 U.S.C. §365 of International Application PCT/EP05/051432, filed Mar. 30, 2005, which was published in accordance with PCT Article 21(2) on Oct. 13, 2005 in French and which claims the benefit of French patent application No. 0403335, filed Mar. 30, 2004 and the benefit of French patent application No. 0412904, filed Dec. 3, 2004.

1. FIELD OF THE INVENTION

The invention relates to a projection module for obtaining a wide projection angle with no distortion. The invention also relates to the application of such a module in front projection and back-projection systems.

2. TECHNICAL BACKGROUND

FIG. 1 shows a conventional design of a back-projector 1, the optical axis of which is centered on the screen, said back-projector comprising an objective 13, two plane deflection mirrors 11 and 12 and a screen 10, which is likewise plane. In this design, the illumination beam 14 emitted by the projector is folded by the deflection mirrors 11 and 12. The system is symmetrical with respect to a plane normal to the screen 10, the optical axis 15 of the beam being in this plane. The projector 1 may have a depth p of up to 45 centimeters for a screen 10 having dimensions of 1106 by 622 millimeters. The aperture angle along the diagonal of the screen must be about 38°. A distortion and an MTF (Modulation Transfer Function) that are acceptable may be obtained with an objective of moderate cost consisting of about ten or so lenses.

Another design is to fold the beam twice, as shown in FIG. 2. The back-projector 2 illustrated in this figure comprises an objective 23 and two plane deflection mirrors 21 and 22 placed facing each other and parallel to a screen 20. The axis of the projection objective 23 is not perpendicular to the centre of the screen 20. It is thus possible to reduce the depth p1 (for example about 20 cm) of the back-projector. However, the height h1 of the lower part of the back-projector 2 (that is to say the part located below the screen) remains large.

Patent Application EP 1203977 filed by Mitsubishi® describes several embodiments of video back-projectors comprising an aspheric deflection mirror, which makes it possible to reduce the optical aberrations and the overall size of the projector. FIG. 3 illustrates a back-projector 3 comprising an objective 33, a first plane deflection mirror 31, an aspheric deflection mirror 32, a second plane deflection mirror 36 and a screen 30. Since the objective 33 makes an angle of about 60° with the normal to the screen, the emitted beam 34 is firstly deflected in a direction normal to the screen 30 by the mirror 34 onto the aspheric mirror 32. The beam is then folded once by the mirror 36 before reaching the screen 30. Thus, the overall size is reduced. However, the back-projector 2 has the drawback that it still remains bulky.

3. SUMMARY OF THE INVENTION

One objective of the invention is to alleviate the drawbacks of the prior art.

In particular, one object of the invention is to produce a projector (of the front-projection or back-projection type) and a projection module or optical motor that are even less bulky than in the known systems.

The objective of the invention is also to reduce both the depth and the height of the projector depending on the size of the projected image.

Another objective of the invention is to correct the distortions that the optical system might induce.

In particular, one object of the invention is to use a curved mirror of the aspheric or hyperbolic type (for example) in this objective. A system using a hyperbolic mirror is known, such as that described in Patent U.S. Pat. No. 5,716,118, but the system must be of large dimensions in order to obtain a large image. Such a system is not easily viable on an industrial scale because of the difficulties in producing such a large mirror.

The invention relates to a projection module for a front projector or for a back-projector that is viable on industrial scale and makes it possible to obtain large projected images of high quality.

For this purpose, the invention proposes a projection module intended to project an image on a screen defining a specified projection plane, said module comprising:

an objective, which comprises means for emitting an imaging beam; and
a curved mirror, the module being noteworthy in that it further comprises at least two deflection surfaces for deflecting said imaging beam, these surfaces being placed in the path of the imaging beam between the objective and the curved mirror.

The deflection surfaces are reflecting or semi-reflecting and are, for example, mirrors or prisms and make it possible to deflect an incident light beam into another direction.

Preferably, the curved mirror is a hyperbolic mirror.

The curved mirror comprises at least one concave or convex portion, and advantageously is concave or convex.

According to a variant of the invention, the angle between the axis of the objective and the projection plane does not exceed 10°.

According to a preferred embodiment, when the projected image is rectangular, the angle between the axis of the objective and the long side of the image projected on the screen does not exceed 10°.

According to another preferred embodiment, when the projected image is rectangular, the angle between the axis of the objective and the short side of the image projected on the screen does not exceed 25°.

Advantageously, at least one of the deflection surfaces is designed to redirect the imaging beam, coming from the objective, onto the curved mirror in a plane perpendicular to the projection plane.

According to one particular feature, the module is noteworthy in that at least one of the deflection surfaces makes an angle of between 40° and 50° with a plane normal to the projection plane.

Preferably, the deflection surfaces are plane surfaces.

According to one advantageous feature, the module includes at least one mask associated with at least one of the deflection surfaces and designed to prevent the propagation of parasitic rays.

The invention also relates to an optical motor for a projection system, the motor being designed to project an image on a screen defining a specified projection plane and comprising:

an imager designed to create the imaging beam; and
illumination means which themselves comprise a light source and focusing means, creating an illumination beam, and means for deflecting the illumination beam onto the imager, the motor being noteworthy in that it further includes the module as defined above and that the means for deflecting the illumination beam comprise at least two separate deflection surfaces for deflecting said illumination beam.

Advantageously, the portion of the illumination beam not reflected by one of the deflection surfaces makes an angle of less than 10° with the portion of the imaging beam not reflected by one of the deflection surfaces.

Furthermore, the invention applies to a projection system comprising a projection module as described above.

According to one particular feature, the projection system comprises a projection screen, the module illuminating the screen via the rear.

4. LIST OF FIGURES

The invention will be better understood and other features and advantages will become apparent on reading the following description, which is given with reference to the appended drawings in which.

5. DETAILED DESCRIPTION OF THE INVENTION

Figure 1:
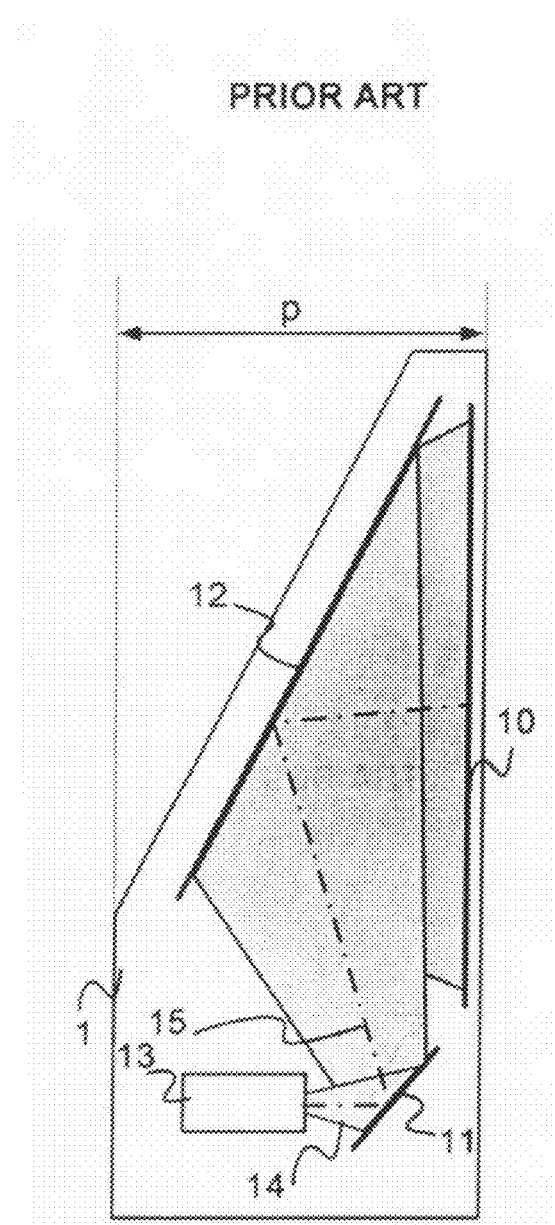
FIGS. 1 to 3 illustrate various embodiments of back-projectors of the prior art.
Figure 2:
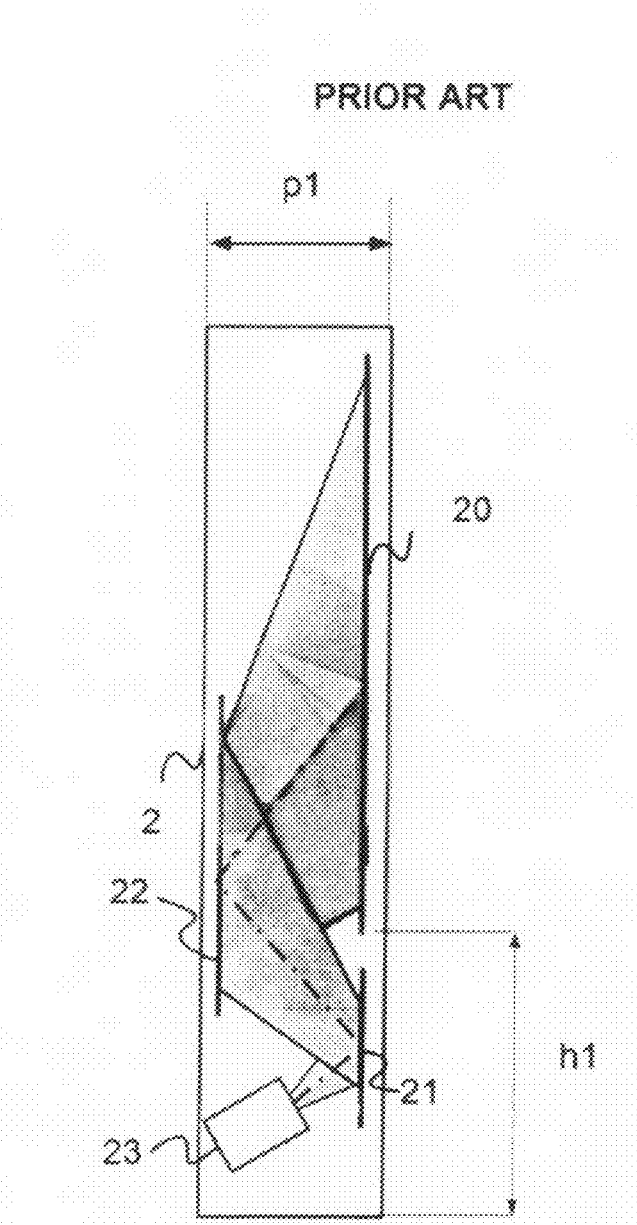
Figure 3:
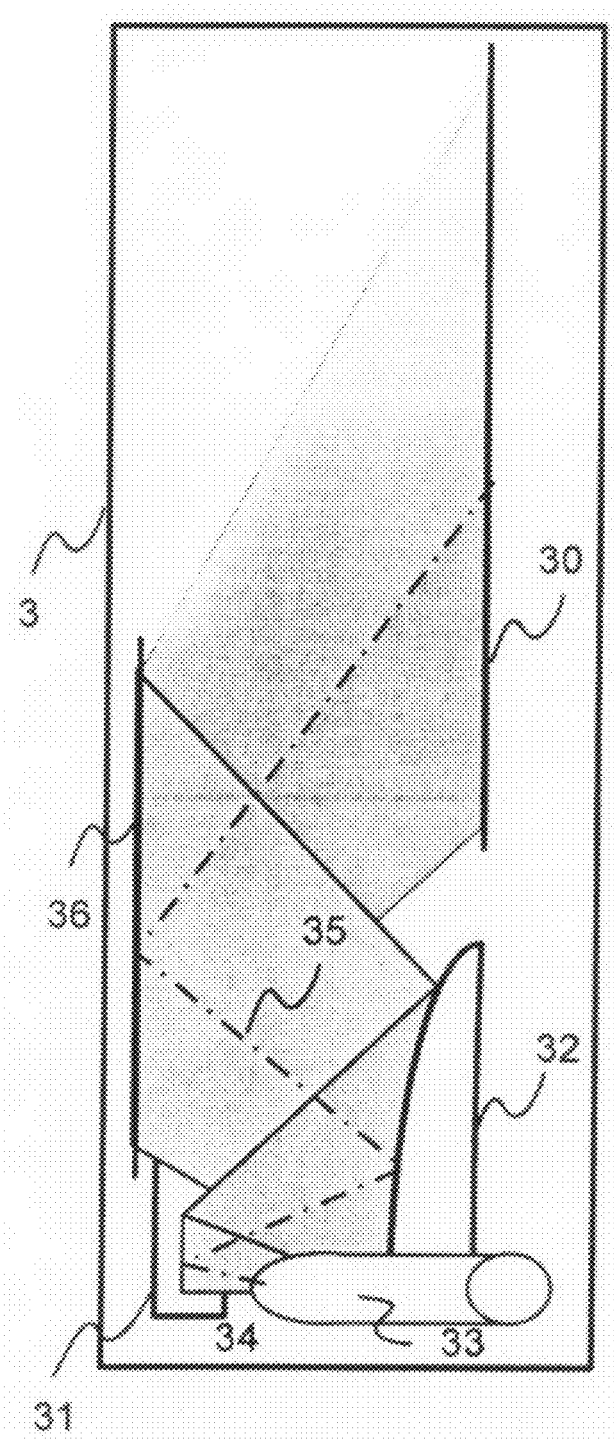
Figure 4:
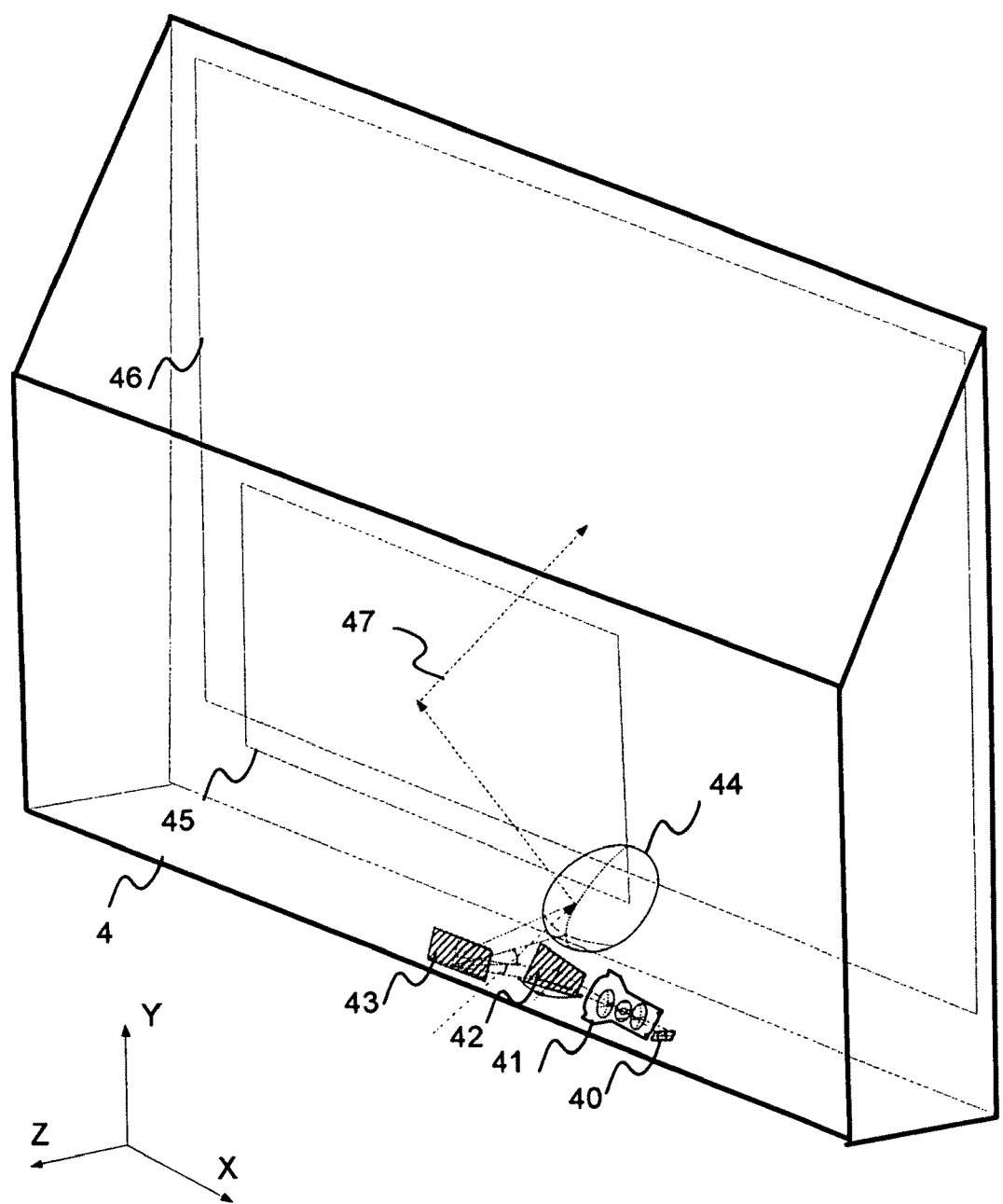
FIG. 4 shows a back-projector according to a first particular embodiment of the invention.

FIG. 4 shows schematically a perspective view of a back-projector 4 according to a first particular embodiment of the invention.

The back-projector 4 comprises:
- a flat projection screen 46, defining a horizontal axis X, a vertical axis Y, both being parallel to the screen 46, and an axis Z normal to the screen 46;
- illumination means (not shown in FIG. 4) that generate an illumination beam;
- an imager 40 that creates an imaging beam from the illumination beam; and
- a projection module.

The imager is, for example, a DMD (Digital Micromirrors Device) from Texas Instruments®, a transmissive LCD (Liquid Crystal Display) or an LCOS (Liquid Crystal on Silicon) device.

The projection module of the projector 4 itself comprises:
- an optical system 41 or objective, which is placed facing the imager 40 and the optical axis of which is approximately parallel to the X direction;
- a first deflection mirror 42, which receives an imaging beam 47 emitted by the optical system 41 and makes it possible to deflect the centre of the beam 47 in a plane normal to the screen 46 and defined by the axes YZ;
- a second deflection mirror 43, which receives the beam 47 deflected by the mirror 42 and is positioned so that the beam is reflected onto a hyperbolic mirror 44;
- the hyperbolic mirror 44, which is designed to enlarge the beam 47 and transmit it to a third deflection mirror 45; and
- the deflection mirror 45, which is parallel to the screen 46 and transmits the beam 47 received from the hyperbolic mirror onto the screen 46.

Since the mirror 44 is hyperbolic, the configuration of the projection module is optimized for obtaining a large projected image with a large angle, whilst having small optical aberrations. Thus, the combination comprising the optical system 41 and the hyperbolic mirror 44 makes it possible to obtain a wide-angle objective.

The imager 40, the optical system 41 and the mirrors 42 to 44 are placed in the lower part of the back-projector 4 so as not to impede the propagation of the imaging beam 47. The distance between the convex mirror 44 and the objective 41 is large enough for the imaging beam to be able to be folded by the mirrors 42 and 43 in a small space, and the beam 47 diverges little in the region lying in front of the convex mirror.

Figure 5:
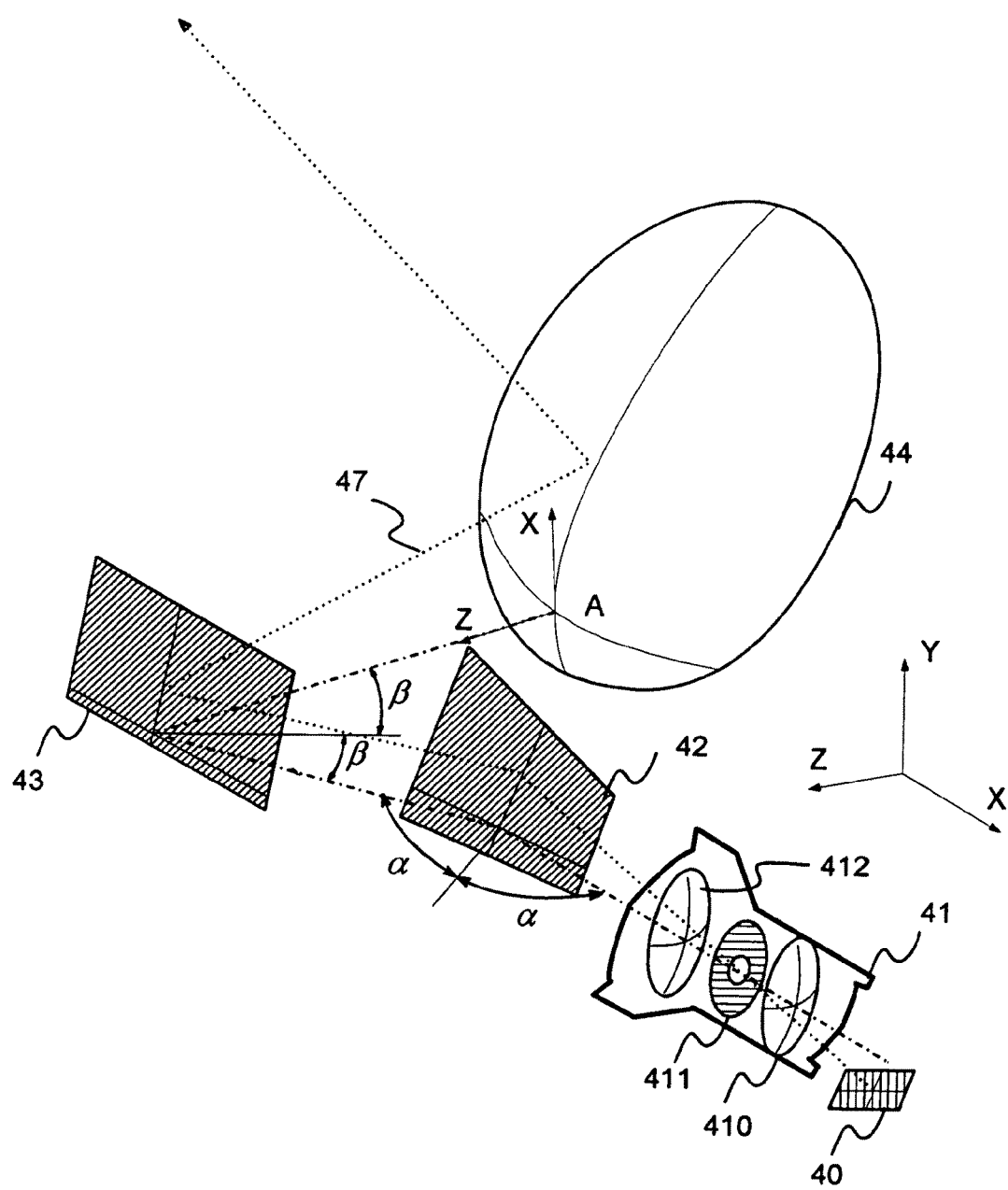
FIG. 5 illustrates, in a perspective view, optical elements of the back-projector shown in FIG. 4.

FIG. 5 shows in greater detail the optical elements 40 to 45 and their arrangement.

The objective 41 comprises, in succession along its optical axis:
- a first complex lens 410, that is to say one consisting of a set of lenses;
- a pupil 411 for preventing the parasitic rays; and
- a second complex lens 412.

The mirror 44 of hyperbolic shape is placed on the exit side of the objective and in such a way that the axis of the hyperbola passing through the foci of the hyperbola coincides with the optical axis XX' of the lens 410.

The light emitted by the lens is reflected by the plane mirrors 42 and 43 then by the hyperbolic mirror 44 and seems to come from a point which is a conjugate point of the pupil 411 of the objective 41. Since the axis of the beam is parallel to the screen 46 according to the embodiment illustrated, the mirror 42 is oriented so that the normal to its surface makes an angle α of 45° with the optical axis of the incident beam. Of course, in different embodiments of the invention the angle α may take other values, in particular when the incident beam is not parallel to the screen 46. Moreover, the mirror 43 is oriented in such a way that the incident beam is deflected correctly onto the hyperbolic mirror 44. Thus, while still parallel to the X axis, the mirror 43 is such that the normal to its surface makes an angle β with the optical axis of the incident beam 47.

As may be seen in FIG. 5, the hyperbolic mirror 44 makes it possible for the beam 47 that it reflects to be made more divergent. In addition, to prevent the lens 410 from disturbing the transmission of the beam reflected by the hyperbolic mirror, it is preferred to use only that portion of the hyperbolic shape lying on one side of a plane passing through the axis of symmetry of the hyperbola. This axis passes through the foci of the hyperbola. The useful light coming from the system 41 is therefore that lying above a plane passing through the optical axis of the objective. An image illuminated by a light source and assumed to be projected on the screen will therefore be off-axis with respect to the axis of the objective 41.

According to a variant of the invention, all the points in the field of the entrance pupil are located at affinity and the system is telecentric.

Such an arrangement may in certain cases induce distortions and deterioration of the MTF (Modular Transfer Function), that is to say deterioration of the spatial frequency response of the optical system. Provision may be made for these defects to be corrected by moving the hyperbolic mirror 44 away from the objective and by interposing a lens between the pupil 411 and the hyperbolic mirror 44, which makes it possible to balance the optical powers on either side of the diaphragm of said lens and to reduce the angle of incidence of the rays of the beam on the hyperbolic mirror 44 and in particular to reduce the angle of incidence of the rays furthest away from the axis of the hyperbola. Thus, the further the hyperbolic mirror is away from the objective 41, the more the latter operates over a small field. To obtain a large optical distance between the hyperbolic mirror 44 and the system 41, while still having a small overall size of the back-projector 4, the mirrors 42 and 43 fold the beam 47 emitted by the system 41.

The invention also makes it possible to correct the astigmatism that could be induced by the hyperbolic mirror 44. To do this, one or two meniscus-shaped plates (not shown in FIG. 5) are provided, these being placed near the pupil 411 of the objective 41. In the case of two menisci, they are placed on either side of the pupil 411. The menisci are placed with their concave faces facing each other and the centres of the menisci are also located on either side of the pupil 411 in such a way that the distance between the two concave faces is less than the sum of the radii of the two concave faces.

An imager 40 of the SLM (Spatial Light Modulator) display device makes it possible to transmit a beam that conveys at least one image because of the spatial modulation. This beam is transmitted by the system 41 to the plane mirror 42, then to the plane mirror 43 and finally to the hyperbolic mirror 44, which reflects the light onto the plane mirror 45. The plane mirror 45 preferably lies parallel to the plane of the screen 46 on the rear face of the back-projector 4.

The SLM display 40 is located on one side of a plane passing through the optical axis XX' of the system 41 so as to illuminate only the hyperbolic mirror 44 that occupies only a portion of the hyperbola located on one side of a plane passing through the axis of the latter. Thus, the lower portion of the mirror 44, which does not receive a useful beam, is preferably truncated.

Figure 6:
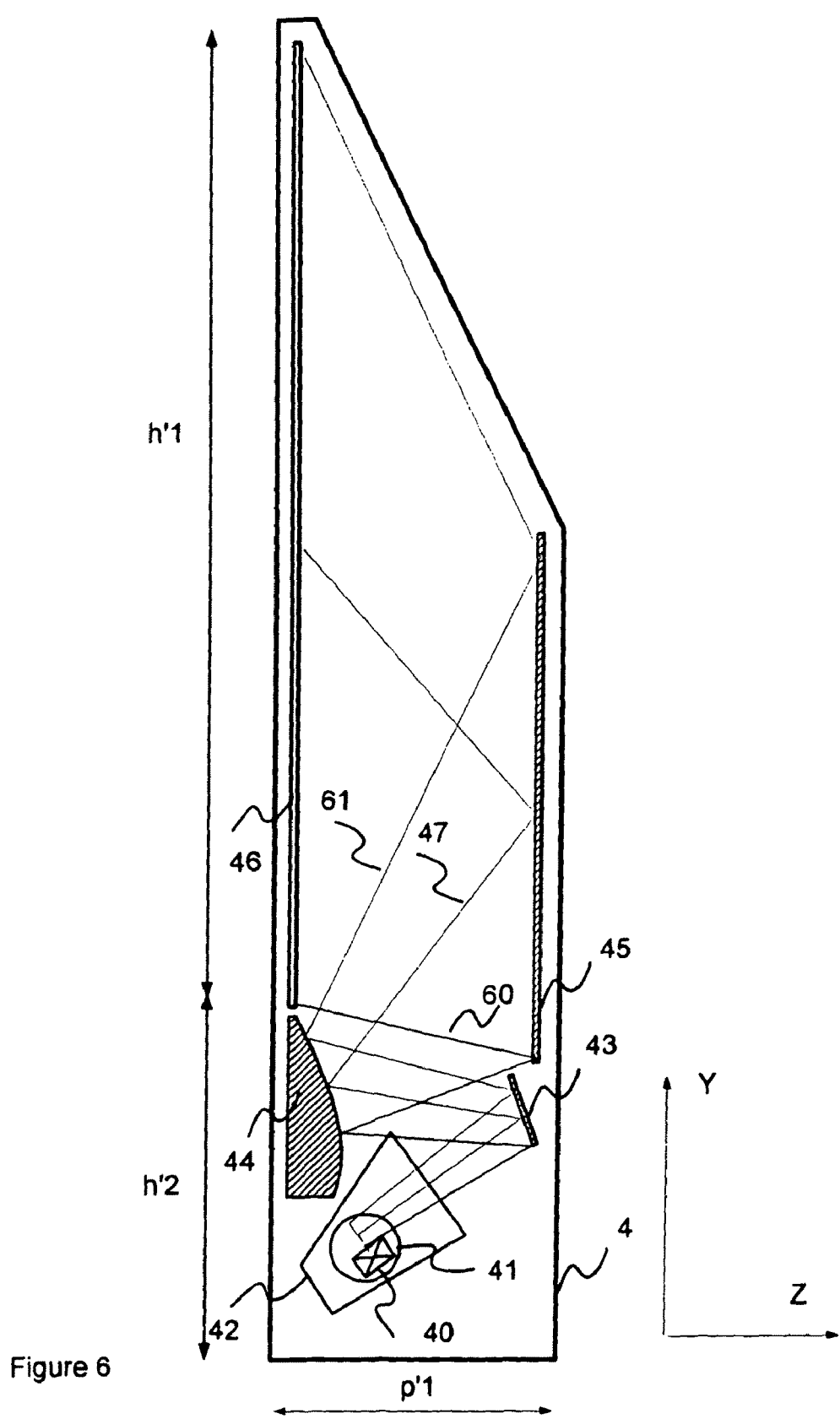
FIGS. 6 and 7 show side and front views, respectively, of the back-projector of FIG. 4.
Figure 7:
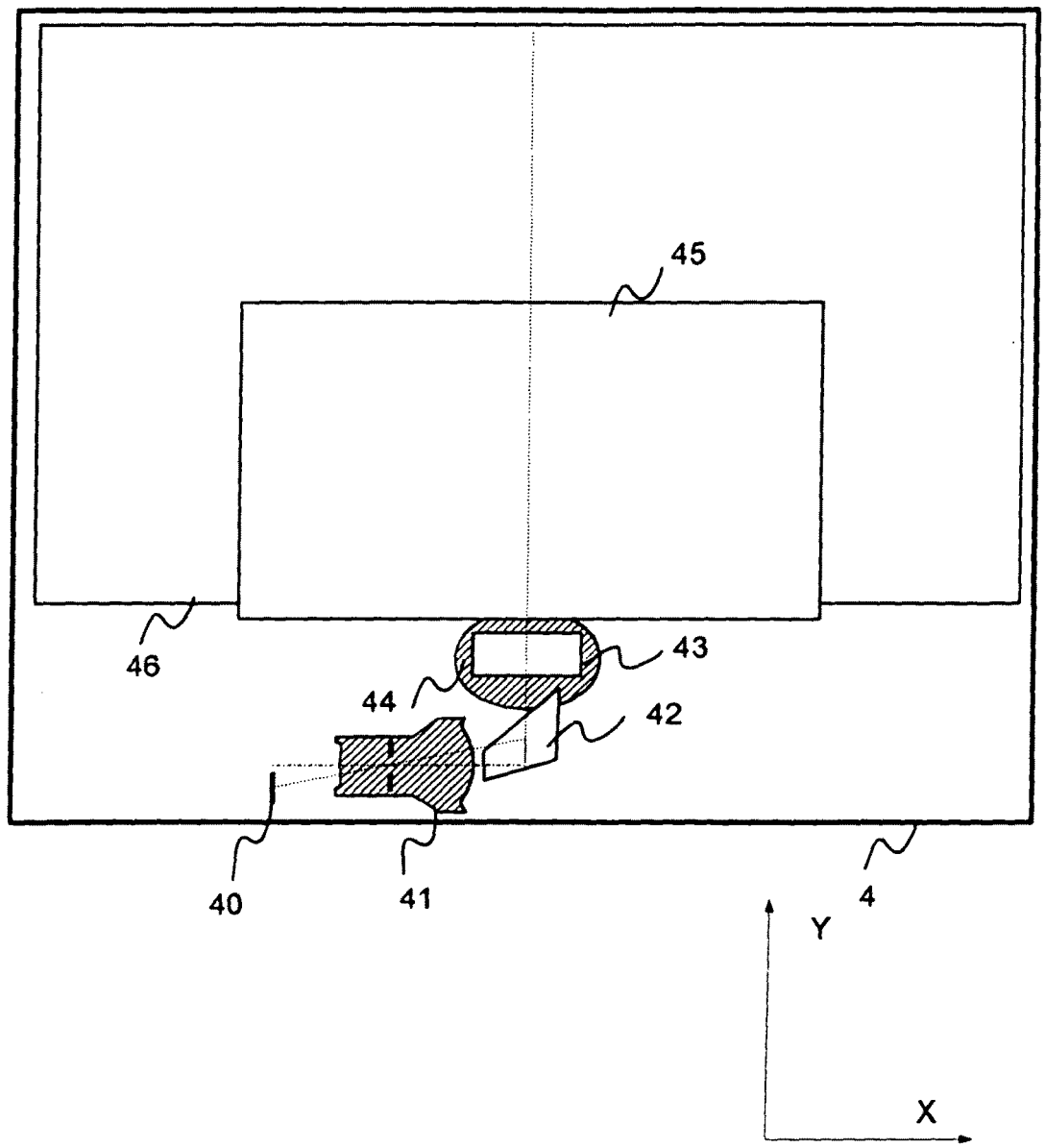

FIGS. 6 and 7 show schematically a side view along the X direction and a front view along the Z direction, respectively.

As indicated in these figures, the optical axis of the optical system 41 is approximately horizontal and parallel to the screen 46. Thus, it has no influence on the depth p'1 of the back-projector 4, while maintaining a small height h'2 below the screen 46. To given an illustration, p'1 is around 160 mm and h'2 is about 320 mm for a screen whose height h'1 is equal to 620 mm.

According to the embodiment illustrated, the parameters of the projector 4 are the following:

α and β are equal to 45° and 21°, respectively;
the distance between the objective 41 and the mirror 42 is equal to 53 mm;
the distance between the mirrors 42 and 43 is 86 mm;
the distance between the mirrors 43 and 44 is equal to 94 mm;
the mirror 42 is a trapezium having as dimensions 103 mm (two non-parallel opposed sides)×55 mm×68 mm (parallel opposed sides); and
the mirror 43 is a rectangle measuring 100 mm×70 mm.

More generally, according to various embodiments of the invention, the optical axis of the optical system 41 is approximately horizontal and makes an angle γ with the screen 46. The angle between the optical axis of the system 41 and the long side of the screen 46 is less than 15°. Preferably, this angle is less than 10°. Thus, it is possible for the depth of the module to be substantially reduced. Even more preferably, the depth is 0 or almost 0, thereby making it possible for the overall size (height and depth) of the projection module, and therefore of the projector 4, to be reduced even further.

In this way, the height of the module is reduced. Such a module is particularly suitable for the case of a one-piece projector (for example a back-projector) in which the module is housed under or on a screen with an image having an aspect ratio of the television or cinema type (the long side is horizontal), or for the case of a projection device separate from the screen, the convex mirror imposing a larger dimension in a direction parallel to the projection screen.

Furthermore, most of the parasitic rays coming from the objective are then in general approximately parallel to the projection screen and are not reflected by the convex mirror. They are therefore eliminated in a very simple manner.

The mirror 42 is inclined to the YZ plane at an angle of 45° in order to deflect the centre ray of the beam 47 emitted in the YZ plane normal to the screen 46, thereby allowing a relatively simple construction of the projection module. The mirror 42 is also inclined to the YZ plane at an angle α of 22.5°. Depending on the various embodiments presented above, in one embodiment of the invention in which the angle γ between the optical axis of the optical system and the screen 46 is not zero, the mirror 42 is inclined to the YZ plane at an angle of 45°±γ/2. Preferably, this angle is between 40° and 50°, since γ is preferably less than 10°.

FIG. 6 also shows the envelope of the beam emitted in a vertical plane centred on the back-projector 4. More precisely, the envelope of the emitted beam is limited in its upper part by a ray 61 and in its lower part by a ray 60.

To reduce the height h'2, the mirror 42 is preferably positioned as high as possible. Thus, the beam reflected by the mirror 43 (in particular the ray 60) grazes the mirror 42 without the latter being an obstacle thereto.

To impede the propagation of the optical beam as little as possible and to reduce the height h'2, the mirror 42 has the shape of a trapezium, which corresponds to the exact impression of the beam emitted by the optical system 41 in its reflection plane.

The mirror 43 is parallel to the X axis and deflects the beam reflected by the mirror 42 onto the hyperbolic mirror 44. It is inclined at an angle of 22.5° to the vertical axis Y. It is positioned so as to be as close as possible to the rear face of the back-projector 4, while still not being an obstacle to the beam reflected by the mirror 44.

Thus, in an optical module configuration with two mirrors 42 and 43 placed between the objective 41 and the hyperbolic mirror 44, the two deflection mirrors 42 and 43 have two functions, since they make it possible, in particular, on the one hand, to redirect the optical imaging beam in a plane normal to the projection screen and, on the other hand, to lengthen the optical distances between the objective 41 and the convex mirror 44. These two functions make it possible in particular to fold the imaging beam more easily in a confined space.

As indicated above, the hyperbolic mirror 44 deflects the beam onto the mirror 45, allowing the image to be magnified.

The equation for the surface of the hyperbolic mirror 44 is the following:

$$z = \frac{cr^2}{1 + \sqrt{1 - (1+k)c^2 r^2}} \quad (1)$$

in which:
c represents the curvature of the mirror (c=1/$R_c$ where $R_c$ is the radius of curvature);
k is the conicity constant; and
r is the radial coordinate.

By way of illustration, in the embodiment illustrated, the radius $R_c$ is equal to 57.7 mm and the constant k is equal to 3.77. The external shape of the hyperbola is an ellipse (measuring 90 mm×136 mm) off-centre by 56 mm from the axis of the hyperbola.

In general, the mirror 44 is convex. Thus, in one embodiment, the mirror 44 is replaced with an aspheric mirror designed to deflect a magnified image onto the mirror 45. The equation for the surface of the aspheric mirror is the following:

$$z = \frac{cr^2}{1 + \sqrt{1 - (1+k)c^2 r^2}} + \sum_{i=1}^{N} \alpha_i r^i \quad (2)$$

where an aspheric term appears, in which:
i is the rank of the term used; and
$\alpha_i$ represents the aspheric coefficient for the term of rank i.

As an illustration, $\alpha_3$ is equal to $-1.09 \times 10^{-6}$ and the other coefficients $\alpha_i$ are zero.

According to another variant of the invention (which may be combined with other back-projector variants described), the mirror located between the aspheric or hyperbolic mirror and the screen is replaced with a mirror inclined to the screen and/or with several deflection mirrors for folding the beam.

According to yet another variant of the invention, there is no mirror between the convex (for example aspheric or hyperbolic) mirror and the screen. The refractive portion of the objective comprises a group of rear lenses $G_r$ composed of four lenses and a group of front lenses $G_f$ composed of three lenses (including one meniscus). The front group receives the light from the object SLM, the image of which has to be projected onto the screen. The front group $G_f$ makes it possible to illuminate the convex mirror (which is a hyperbolic mirror according to the example illustrated) using the beam that it receives from the rear group $G_r$. The hyperbolic mirror is located with respect to the group of lenses $G_f$ in such a way that one of its foci F1 lies in the plane of the exit pupil of the front group $G_f$. The other virtual focus F2 lies in the plane of the virtual exit pupil of the system. The hyperbolic mirror conjugates the pupils and has the advantage of increasing the field angle, and therefore of increasing the magnification of the system. In addition, a positive lens located between the meniscus of the group $G_f$ and the hyperbolic mirror is provided in order to reduce the envelope of the light rays of the field so as to make it easier for the light beam to be folded by a plane mirror in order to reduce the overall size of the objective.

However, the hyperbolic mirror may introduce a geometrical distortion. To correct this distortion, the rear group of lenses $G_r$ includes a lens having a surface in the form of a conic. Advantageously, this conic is a conic of the same type as the form of the convex mirror so as to provide an almost perfect correction of the geometrical distortion. Advantageously, this conic is therefore a hyperbola. Preferably, the ratio of the conics (the hyperbolic mirror and the rear lens) is approximately proportional to the ratio of the positions of the foci of the hyperbolae. For example, if the focus of the equivalent rear lens $G_r$ is set, the pupil is placed at the focus of this lens and the hyperbola is placed at "a certain distance away". This distance constrains the use of a focus and a conic for the hyperbola in order to obtain the given magnification (for example 64) on the screen. The shape of the conic surface that it has to give the lens or the group of lenses $G_r$ in order to correct the objective is such that the ratio of this conic to the conic of the hyperbolic mirror is approximately equal to the ratio of the distances of the foci of the hyperbola to the principal planes of the hyperbola. These distances are the equivalent distances seen from the corresponding hyperbola through the lenses of the group $G_f$.

However, the hyperbolic lens must be some distance from the diaphragm of the objective so that the precorrection of the distortions can take place over an extended beam.

Furthermore, the lens thus designed makes it possible to correct not only the geometrical distortions but also the field curvature.

Moreover, the astigmatism defects induced by the system do not follow the same laws as the geometrical distortions. They are not corrected by the above means. This is why at least one meniscus is provided for correcting the astigmatism defects induced by the system.

According to one embodiment of the projector 4, the mirrors 42 and 43 may be replaced with a complex prism. There may be complete reflection for the surface equivalent to the mirror 42. However, the surface equivalent to the mirror 43 must be metallized since the angles of the incident beam are small compared with the normal to this surface.

Figure 8:
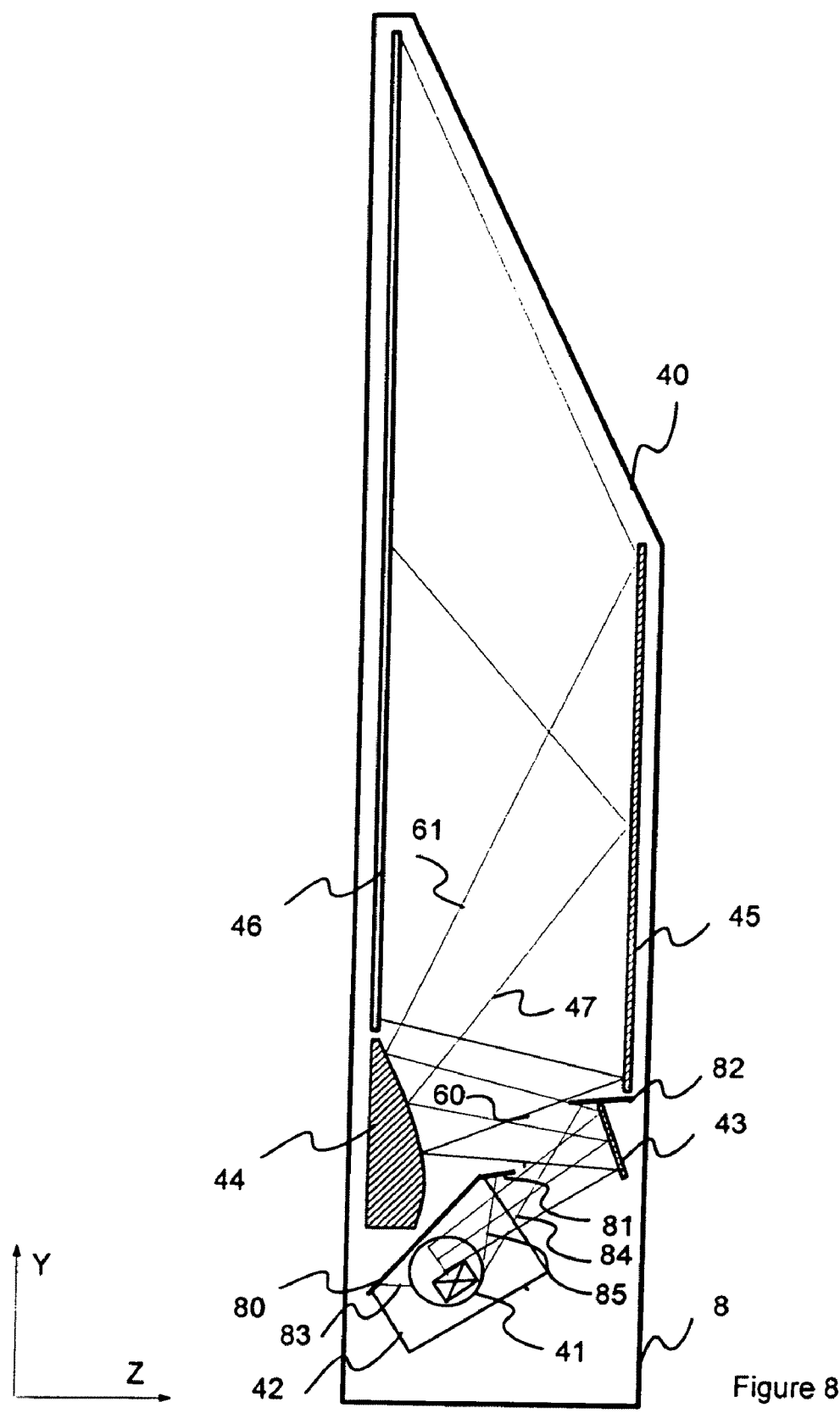
FIG. 8 shows a second embodiment of the invention.

FIG. 8 shows a second embodiment of a back-projector 8 according to the invention, particularly well suited for the prevention of vignetting or the elimination of parasitic optical rays.

The back-projector 8 comprises the same elements as the back-projector 6 illustrated above. These common elements bear the same references and will therefore not be described further.

The back-projector 8 further includes masks 80 to 82 parallel to the X axis, each associated with at least one of the mirrors 42 and 43 and positioned so as to stop the parasitic rays coming from the system 41 (either directly or after reflection on one of the mirrors, especially on the mirror 42).

The mask 80 is tangential to the mirror 42 on the side closest to the hyperbolic mirror 44. Thus, it blocks parasitic rays 83 from being directed onto the hyperbolic mirror 44 or the screen 46.

The mask 81 is attached to the mask 80, while being approximately horizontal so as not to be an obstacle to the optical beam reflected by the mirrors 42 and 43, respectively. Thus, it blocks parasitic rays 85 from being directed onto the top of the back-projector 8 and especially onto the screen 46.

The mask 82 is tangential to the mirror 43 on the upper side close to the plane mirror 45, while being positioned and of dimensions so as not to be an obstacle to the optical beam reflected by the mirrors 43 and 44, respectively. Thus, it blocks parasitic rays 84 from being directed onto the mirror 45.

The masks 80 to 82 preferably have, along the X direction, a large dimension that is limited only by the width of the projector 8. Along the directions in the YZ plane, the masks are positioned so as not to impede the propagation of the imaging beam.

According to an embodiment variant, the masks are grouped together as a single surface that completely separates the objective and the illumination means from the mirrors 42 to 45. Only a rectangular or trapezoidal aperture (depending on the angle of inclination of the imaging beam to the surface) made in the mask-forming surface is provided so as to let the imaging beam pass through the aperture, while preventing the parasitic beams from passing out through the aperture.

Moreover, it should be noted that most of the parasitic rays are very simply eliminated in a configuration in which the optical axis of the optical system 41 is approximately horizontal, along an axis approximately parallel to the mirrors 44 and 45 and also to the screen 46 (back-projectors 6 and 8). This is because, in such a configuration, most of the parasitic rays are approximately horizontal and directed towards one side of the back-projector. Thus, most of these parasitic rays that do not encounter the first deflection mirror 42 are not directed towards a mirror or the screen, but towards other internal elements of the back-projector, which are preferably non-reflecting.

Figure 13:
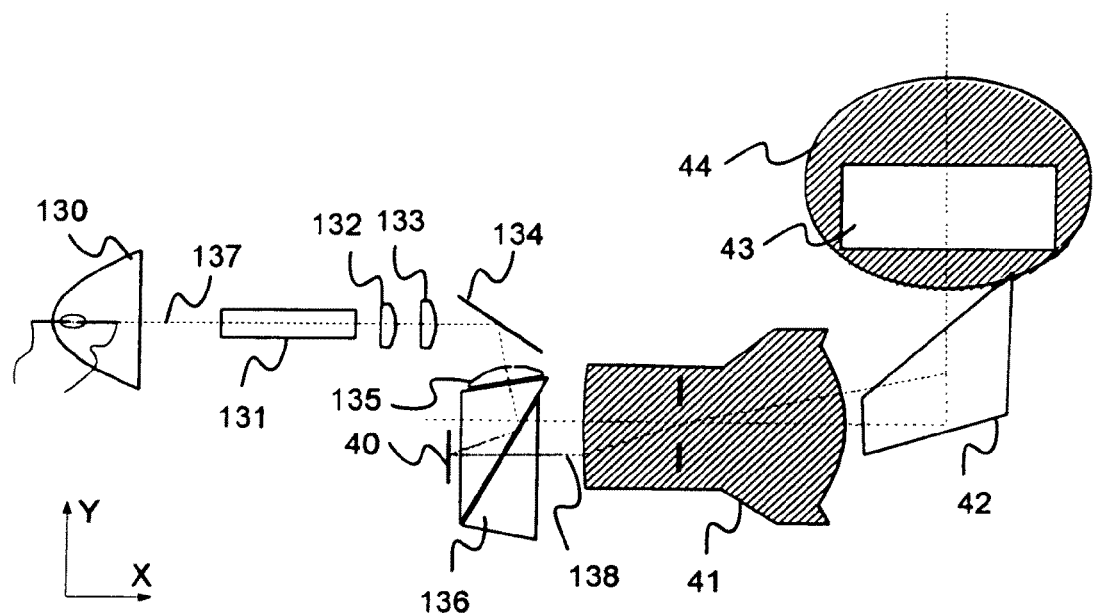
FIGS. 13 and 14 illustrate an optical motor used in the back-projector of FIG. 4.

FIG. 13 shows an optical motor with which the back-projector 4 is equipped. The optical motor comprises:
a lamp 130 and its reflector;
a 16:9 guide 131 (corresponding to the 16:9 screen 46);
lenses 132 and 133;
a plane deflection mirror 134;
a lens 135;
a prism 136;
the imager 40;
the objective 41; and
the mirrors 42 to 44.

The lamp 130 and its reflector emit an illumination beam 137 that is concentrated at the entrance of the guide 131. On exiting the guide 131, the lenses 132 and 133 transmit the beam 137, which strikes the mirror 134. The mirror 134 is inclined to the optical axis of the incident beam so as to deflect the beam 137 onto the lens 135, which is cemented to the prism 136. The optical axis of the lamp 130, the guide 131 and the lenses 132 and 133 is approximately parallel to the projection plane associated with the screen 46. Thus, the depth of the back-projector 4 is reduced.

The beam 137 then penetrates the prism 136 via the lens 135 before being reflected by an opposite face of the prism 136 onto the imager 40. The position of the various elements of the optical motor and the focal lengths of the lenses are such that the exit of the guide 131 is imaged on the imager 40.

After reflection on the imager 40, the beam 137 therefore forms a beam representative of an image 138, which is sent to the prism 136 before penetrating the optical system 41 and then being reflected by the mirrors 42, 43 and 44, as indicated above.

The optical beam 137 emitted by the lamp 130 is oriented in the same sense to that of the optical beam emanating from the imager 40. In this way, the elements 130 to 133 are placed in a half-space located to the rear of the imager 40. Moreover, that portion of the illumination beam 137 located in front of the deflection mirror 134 is approximately parallel to the imaging beam emanating from the objective 41. Preferably, the angle between these two beams is less than 10°. Also preferably, the angle between the projection plane (defined by the screen 46) and that portion of the illumination beam 137 located in front of the deflection mirror 134 is also less than 10°. The elements 130 to 135 of the illumination system, the imager 40, the objective 41 and the mirrors 42 to 44 may therefore occupy a parallelepipedal space of reduced height and depth (along the Y and Z axes, respectively) and a length that does not exceed the width of the screen 46.

Figure 14:
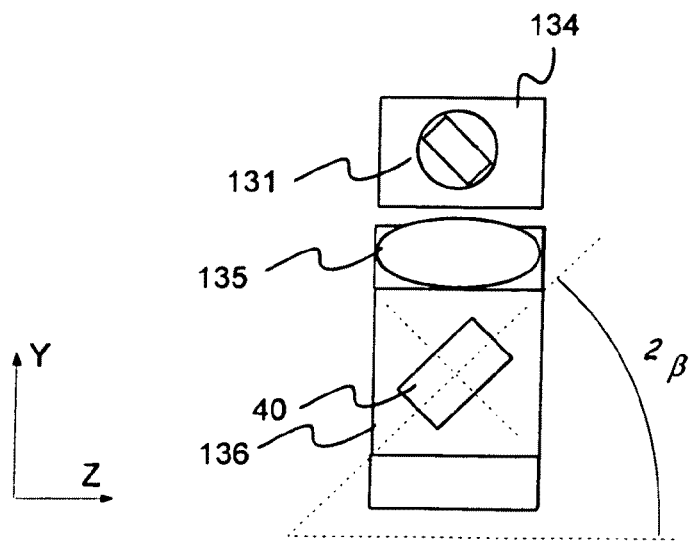

FIG. 14 illustrates a front view of the optical motor (except for the lamp 130, which is not shown) shown in FIG. 13 and indicating the positions of the various elements.

Since the normal to the mirror 43 makes an angle β with the optical axis of the incident beam 47, the long axis of the imager 40 makes an angle of 2β with the Z direction (normal to the screen 46). Likewise, the long side of the exit of the 16:9 guide 131 also makes an angle of 2β with the Z direction (however, the long side of the exit of the guide and the long axis of the imager are oppositely oriented).

Figure 9:
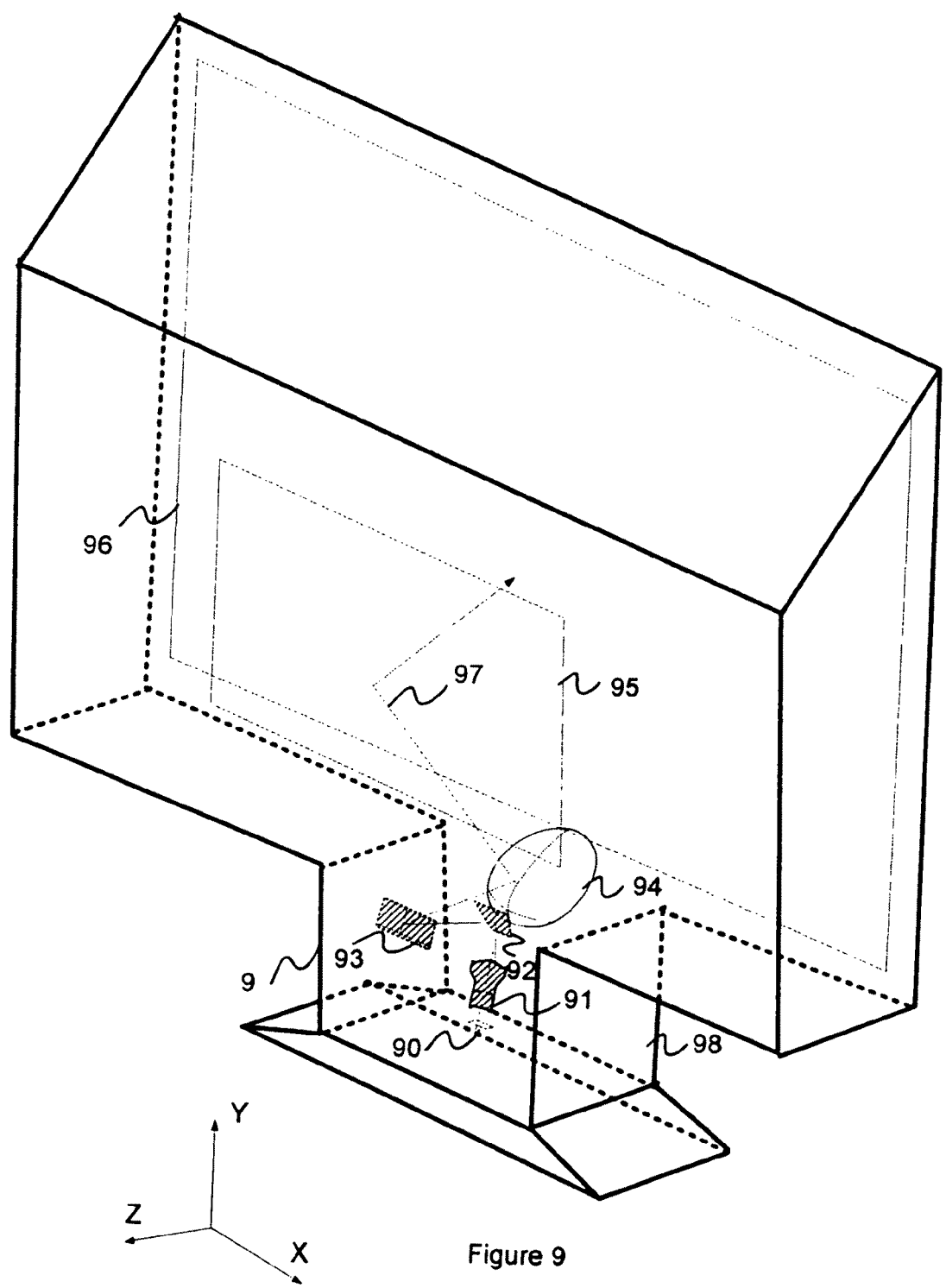
FIGS. 9 to 11 illustrate a third embodiment of the invention.
Figure 10:
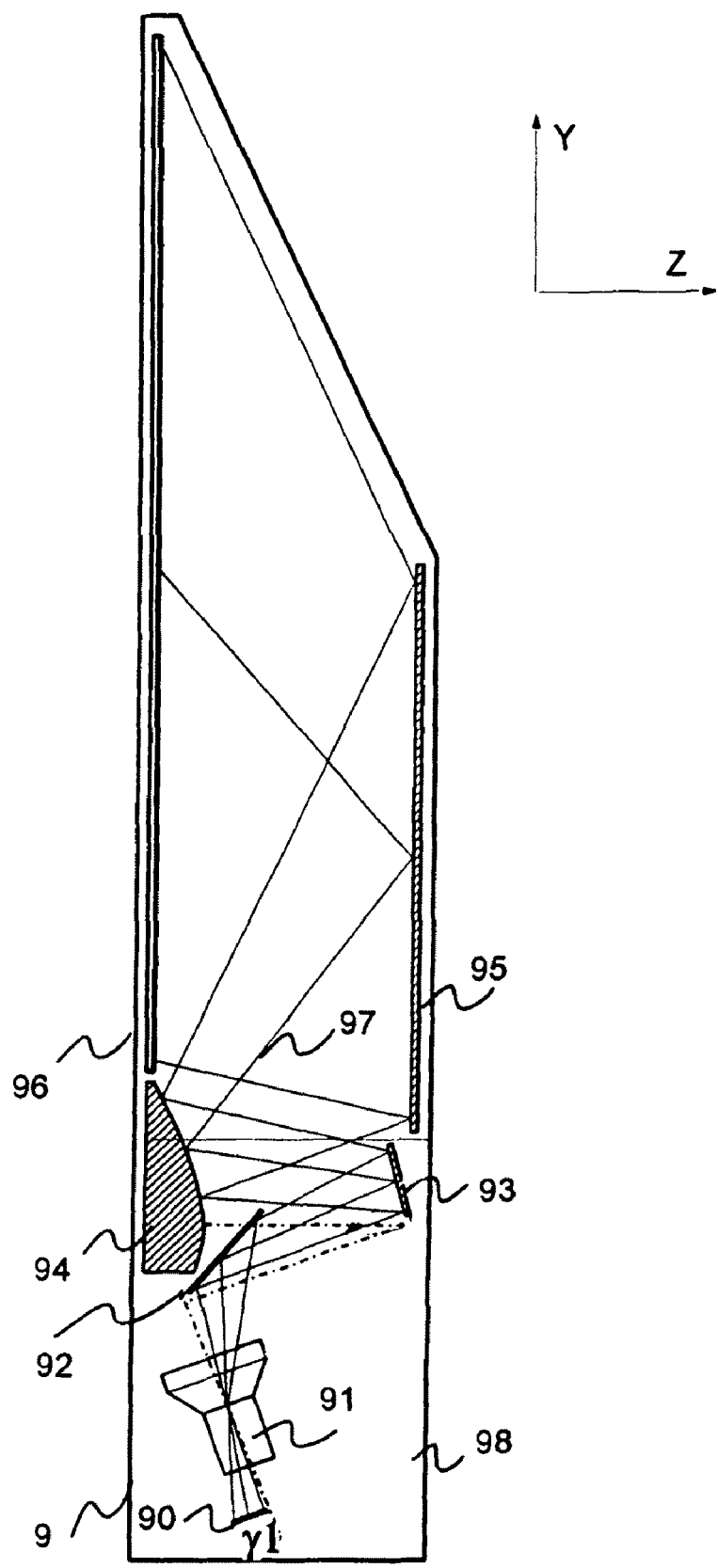
Figure 11:
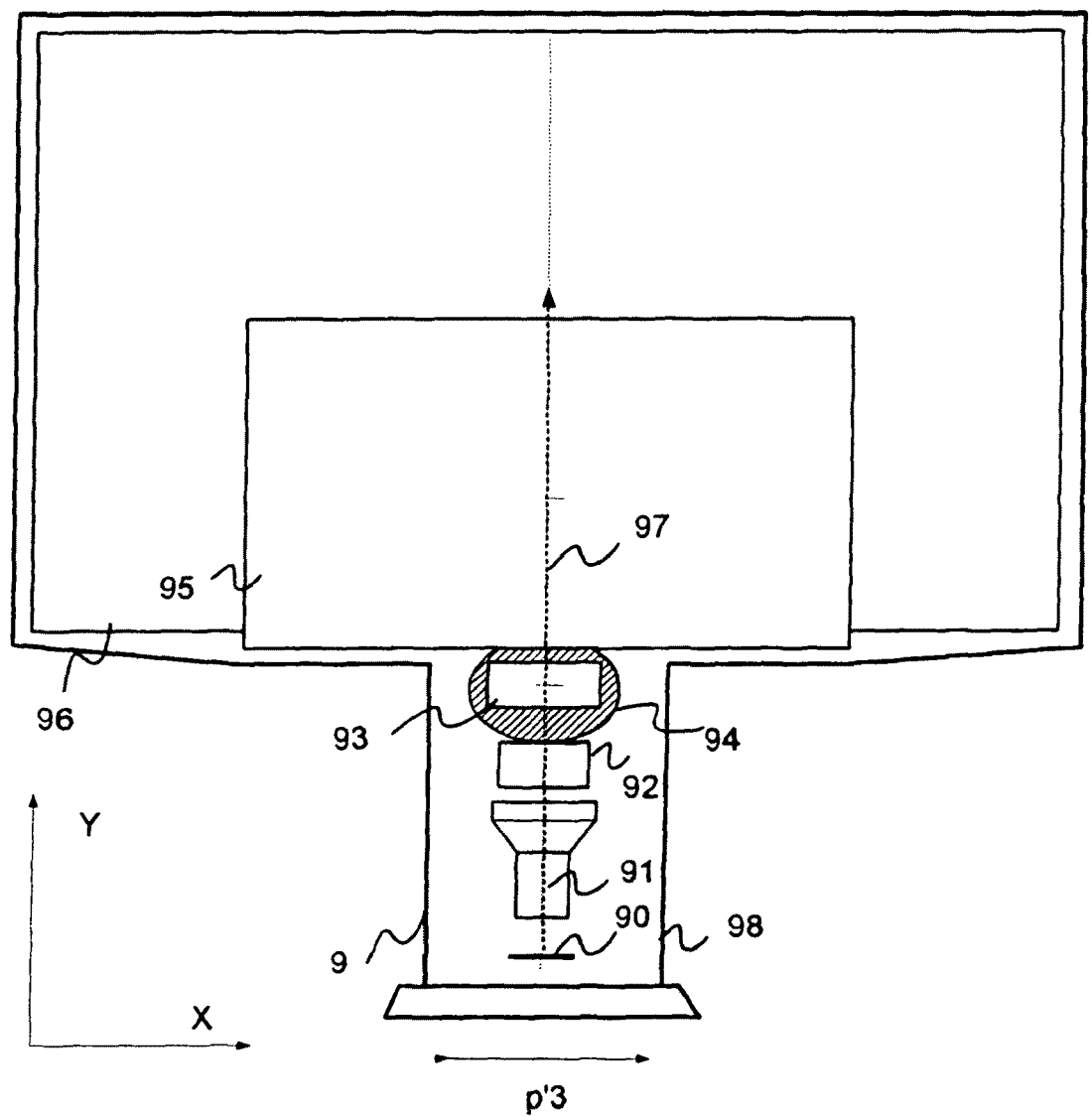

FIGS. 9 to 11 illustrate a third embodiment of a back-projector 9 according to the invention, particularly well suited to a configuration with a pedestal 98.

The back-projector 9 comprises:
a flat projection screen 96 defining a horizontal axis X, a vertical axis Y, both being parallel to the screen 96, and an axis Z normal to the screen 96;
illumination means (not shown in FIG. 9) which generate an illumination beam;
an imager 90, which creates an imaging beam from the illumination beam; and
a projection module.

The projection module of the projector 9 itself comprises:
an optical system 91 or objective, placed facing the imager 90, the optical axis of which is approximately parallel to the Y direction (the approximately vertical optical axis);
a first deflection mirror 92, which receives an imaging beam 97 emitted by the optical system 91 and makes it possible to deflect the centre of the beam 97 in a plane inclined little to the horizontal plane XZ;
a second deflection mirror 93, which receives the beam 97 deflected by the mirror 92 and is positioned so that the beam is reflected onto a hyperbolic mirror 94;
the hyperbolic mirror 94 (similar to the mirror 44 described above), which is designed to enlarge the beam 97 and transmit it to a third deflection mirror 95; and
the deflection mirror 95 (similar to the mirror 45 illustrated above), which is parallel to the screen 46 and transmits the beam 97 received from the hyperbolic mirror onto the screen 96.

As an illustration, the mirrors 92 and 93 make an angle of 52° and 18°, respectively. Thus, the objective 91 makes an angle of 22° ((90+2×18)°−2×52°=22°) to the screen.

Thus, as indicated in the perspective view shown in FIG. 9, the optical elements 90 to 94 are in the pedestal 98, which may be relatively narrow (while still maintaining good mechanical strength of the assembly), only the base of the pedestal 98 being enlarged, in order to provide the assembly with a good understanding. The width p'3 of the pedestal is, for example, 250 mm and its depth 160 mm, for a screen measuring 1106× 620 mm. Thus, it is possible to house altogether the optical elements 90 to 94, the lamp and the system for illuminating the imager. The projection module is thus particularly well suited to a back-projector with a pedestal, or in a configuration of a front projector that is unfolded for an image of the television or cinema type with a shorter vertical side than the horizontal side.

FIG. 10 and FIG. 11, respectively, show schematically a side view and a front view, respectively, of the back-projector 9 on the X axis and Z axis, respectively.

The optical axis of the system 91 lies approximately in the YZ plane and makes an angle γ1 with the vertical axis Y. The angle γ1 according to the example illustrated is equal to 22°. According to an embodiment variant, it lies between 20° and 24° with the apertures chosen (which correspond to angles of incidence of greater than 55°). This avoids having to increase the area of the mirror 92 too much and avoids vignetting.

More generally, the angle γ1 lies between 20° and 24°. This already allows the depth of the back-projector to be reduced compared with the prior art. Preferably, it is less than 10° in order to reduce the depth of the back-projector much more.

FIG. 11 illustrates schematically the back-projector 9 in a front view along the Z axis.

Figure 15:
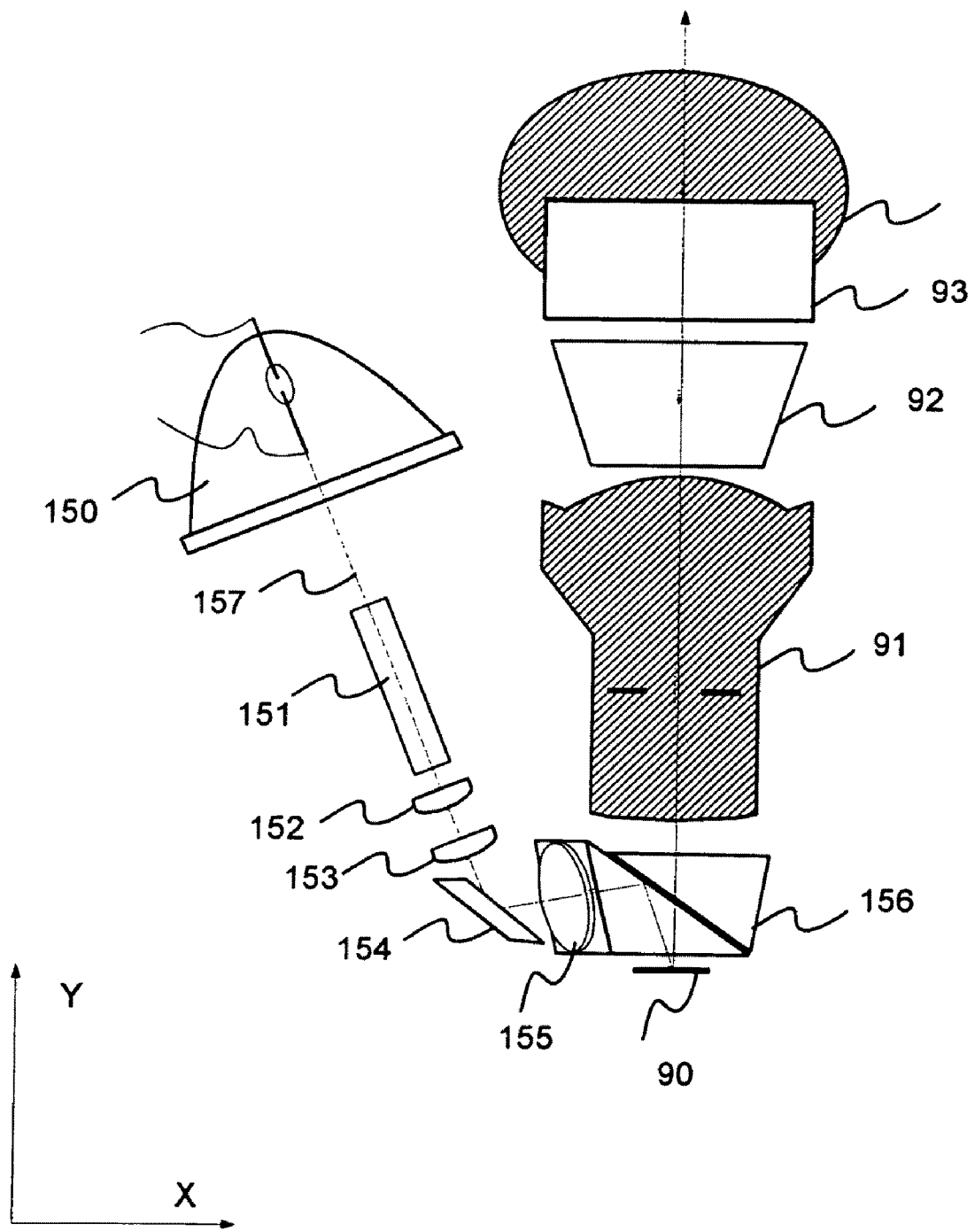
FIG. 15 shows an optical motor used in the back-projector of FIGS. 9 to 11.

FIG. 15 shows an optical motor with which the back-projector 9 is equipped. The optical motor comprises:
- a lamp 150 and its associated reflector;
- a 16:9 guide 151 (corresponding to the 16:9 screen 96);
- lenses 152 and 153;
- a plane deflection mirror 154;
- a lens 155;
- a prism 156;
- the imager 90;
- the objective 91; and
- the mirrors 92 to 94.

The lamp 150 and its reflector emit an illumination beam 157, which is concentrated at the entrance of the guide 151. On exiting the guide 151, the lenses 152 and 153 transmit the beam 157, which strikes the mirror 154. The mirror 154 is inclined to the optical axis of the incident beam so as to deflect the beam 157 onto the lens 155, which is cemented to the prism 156. The optical axis of the lamp 190, the guide 141 and the lenses 142 and 143 is slightly inclined to the projection plane associated with the screen 46. Thus, the depth of the back-projector 9 is reduced.

The beam 157 then penetrates the prism 156 via the lens 155 before being reflected by an opposite face of the prism 156 onto the imager 90. The position of the various elements of the optical motor and the focal lengths of the lenses are such that the exit of the guide 151 is imaged on the imager 90.

After reflection on the imager 90, the beam 157 therefore forms a beam representative of an image 158, which is sent to the prism 156 before penetrating the optical system 91 and then being reflected by the mirrors 92, 93 and 94, as indicated above.

The optical beam 157 emitted by the lamp 190 is oriented in the opposite sense to that of the optical beam emanating from the imager 90. In this way, the elements 150 to 155 are placed in a half-space located in front of the imager 90. Moreover, that portion of the illumination beam 157 located in front of the deflection mirror 154 is approximately parallel to the imaging beam emanating from the objective 91. Preferably, the angle between these two beams is less than 10°. According to other embodiments of the invention, the angle between the projection plane (defined by the screen 96) and that portion of the illumination beam 147 located in front of the deflection mirror 154 is also less than 10°. The elements 150 to 155 of the illumination system, the imager 90, the objective 91 and the mirrors 92 to 94 may therefore occupy a parallelepipedal space of reduced height, width and depth, and therefore may easily house in the pedestal 98.

Figure 12:
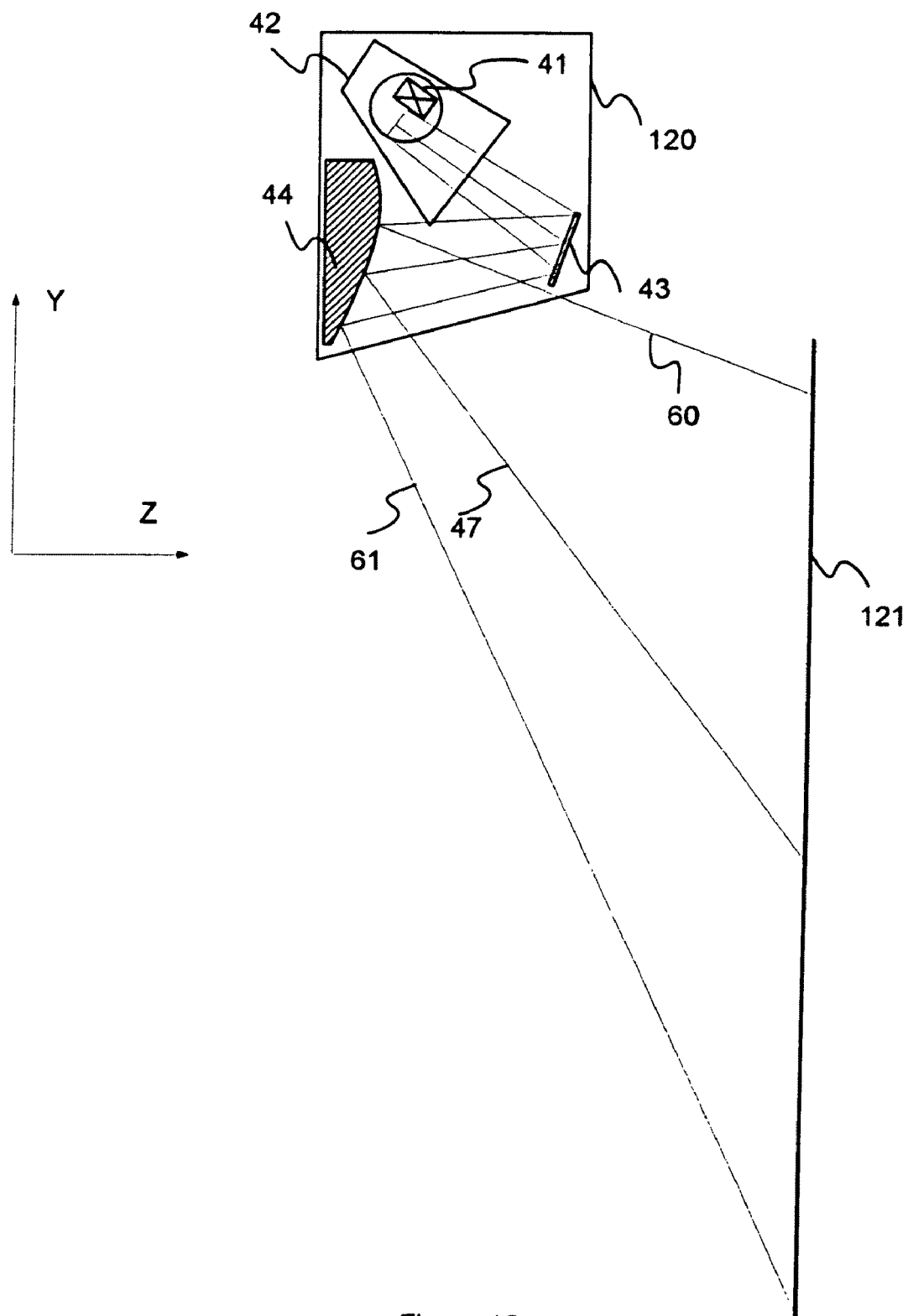
FIG. 12 shows a front projector according to one embodiment of the invention.

FIG. 12 shows a front projection system, which comprises a vertical flat screen 121 and a front projection system 120 positioned, for example, under a ceiling facing the screen 121, so that it projects an image on the screen 121. The projection system 120 is separate from the screen 121. However, unlike a back-projector (in which the screen is illuminated via the rear), the screen 121 is illuminated on its visible face by the projection system.

The screen 121 defines a horizontal axis X, a vertical axis Y, both being parallel to the screen 121, and an axis Z normal to the screen 121.

The projection system 120 comprises elements common to the back-projector 4, which bear the same references, especially:
- illumination means 130 to 136;
- an imager 40;
- an optical system 41 placed facing the imager 40, the optical axis of which is approximately parallel to the X direction;
- a first deflection mirror 42, which receives a beam 47 emitted by the optical system 41 and makes it possible to deflect the centre of the beam 47 in a plane normal to the screen 46 and defined by the YZ axes;
- a second deflection mirror 43, which receives the beam 47 deflected by the mirror 42 and is positioned so that the beam is reflected onto a hyperbolic mirror 44; and
- the hyperbolic mirror 44, which is designed to enlarge the beam 47 and transmit it to the screen 121.

The mirror 45 is unnecessary since the projection system 120 may be moved away from the screen without, of course, increasing the dimensions of the system 120, and positioned in such a way that the image is correctly projected on the screen 121 (the beam 47 is not folded between the mirror 44 and the screen 121).

According to embodiment variants of the invention, masks similar to the masks 80 to 82 illustrated in FIG. 8 are added.

In different variants, the size and the geometry of the mirrors 42, 43 and 44 may be modified. In particular, the mirror 44 may be an aspheric mirror.

According to embodiment variants of the invention, the imaging means are similar to the means 150 to 155 illustrated in FIG. 15, thereby being particularly well suited to a front projection system which is unfolded (the folded position corresponding, for example, to the storage mode and the unfolded position to the operating mode).

Thus, the projection module is particularly well suited to a back-projector with a pedestal, or in a configuration of a front projector that is unfolded for an image of the television or cinema type with a shorter vertical side than the horizontal side.

Figure 16:
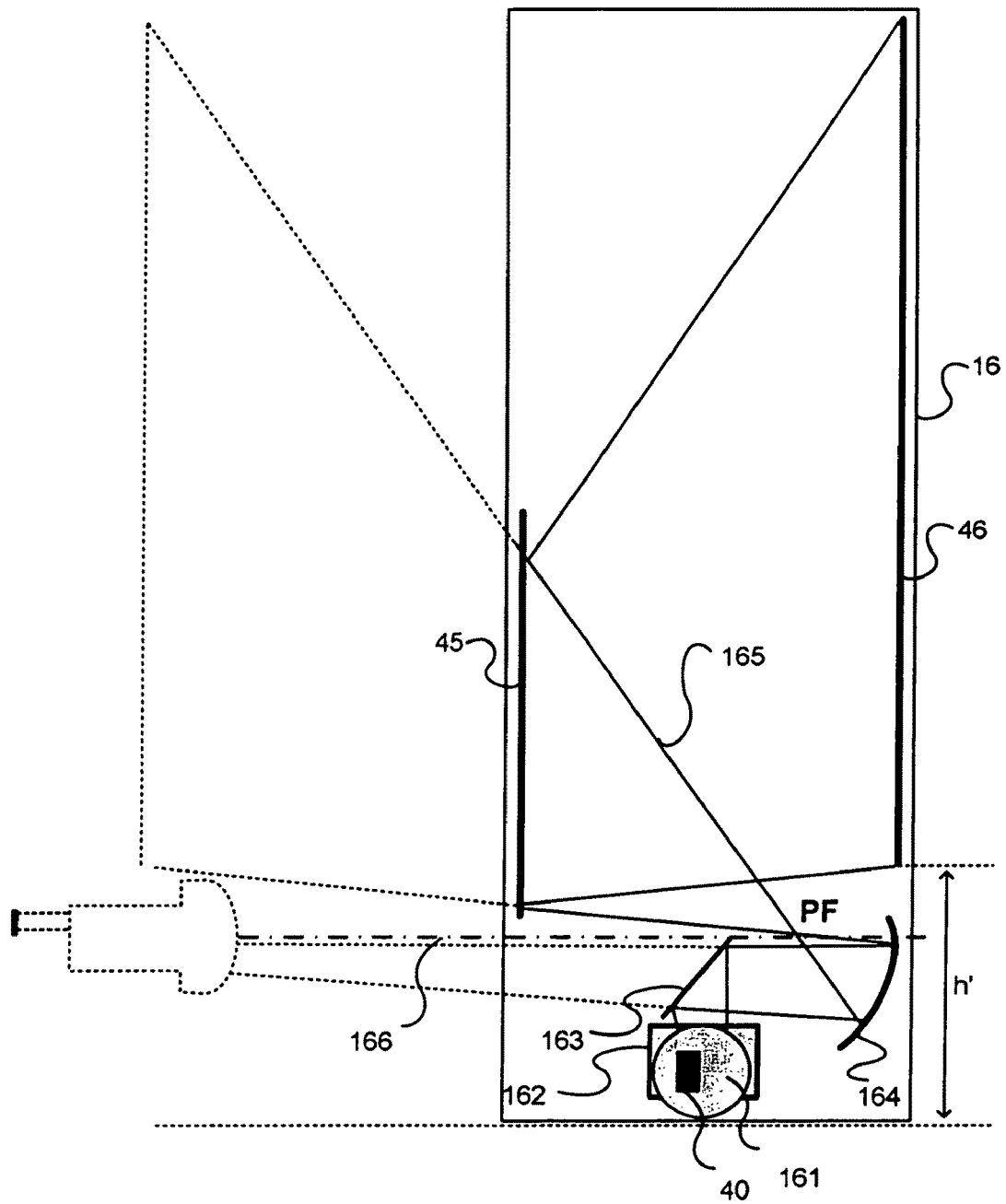
FIG. 16 is a highly schematic diagram of a back-projector according to one embodiment of the invention.

FIG. 16 illustrates a back-projector 16 according to an embodiment variant of the invention, with a concave aspheric mirror 164, in exploded form, which back-projector comprises:
- an imaging source or imager 40;
- an objective 161 illuminated by an imaging beam produced by the source 40;
- the concave aspheric mirror 164, which enlarges the image while folding the beam;
- two plane folding mirrors 162 and 163 placed between the objective 161 and the concave mirror 164;
- a folding mirror 45; and
- a back-projection screen 46.

The back-projector 16 includes elements similar to the components of the back-projector 4, these bearing the same references (especially the means generating an illumination beam as illustrated in FIG. 13 (the lamp 130 and its reflector, the 16:9 guide 131, the lenses 132 and 133, etc.), the imager 40, the objective 20, the folding mirror 45 and the screen 46), and will not be described further.

The axis of the objective 161 of the folded back-projector 16 is horizontal. The imaging beam emanating from the objective 161 firstly illuminates the mirror 162, which is inclined at 45° to the optical axis and perpendicular to the screen 16. The beam is thus sent in a direction parallel to the screen 16, its optical axis being in a plane normal to the screen 16. The beam reflected by the mirror 162 then illuminates the mirror 163, which is inclined at 45° to the optical axis and the normal of which is perpendicular to the screen 16. The beam is thus sent in a direction perpendicular to the screen 16 in order to illuminate the concave mirror 164. The imaging beam 165 not folded by the plane folding mirrors 162, 163 and 45 has been shown by dotted lines in FIG. 16.

In general, all the optical axes of the various elements of the unfolded projection system are perpendicular to the projection plane, assumed to be vertical—they are therefore horizontal (for a system shown in unfolded form).

However, according to alternative embodiments which make it possible for the illumination portion to be more easily housed (inclination of the optical illumination core, lamp casing, electronic card attached to the imager 40), the actual axis of the objective is inclined. This is because the axis of one element of the projection system may become non-horizontal after folding by a folding mirror. For example, if the large mirror is inclined, all the following elements, in particular the concave mirror, will also be inclined at twice the angle. Preferably, the angle between the axis of the objective and the projection plane does not exceed 10°. Likewise, the angle between the axis of the objective and the long side of the image projected on the screen preferably does not exceed 10°. Preferably, the mirror 162 makes an angle of between 40° and 50° with a plane normal to the screen 46.

The optical portion of the projector possesses an optical axis 166, the optical beam produced 165 (and therefore the imager 40) being off-axis with respect to this axis 166. The concave mirror 164 is such that, seen from the screen 46, the beam 165 seems to come from a pupillary region corresponding to a pupil PF located in the path of the imaging beam 165 between the mirror 164 and the screen 46.

The concave aspheric mirror 164 has an axisymmetric shape, the reflecting surface of which is given by the following aspheric surface equation:

$$Z(r) = \frac{r^2/R}{1+\sqrt{1-(1+c)(r/R)^2}} + a_1 r + a_2 r^2 + a_3 r^3 + a_4 r^4 + a_5 r^5 + a_6 r^6 + \ldots$$

where:
r represents the distance of a given point from the optical axis;
Z represents the distance of this point from a plane perpendicular to the optical axis;
the coefficient c is the conic;
the parameter R corresponds to the radius of curvature of the surface; and
the parameters $a_1, a_2, \ldots a_i$ are asphericity coefficients of order 1, 2 and i, respectively.

According to an alternative embodiment, the mirror 164 is a hyperbolic mirror (that is to say with zero coefficients $a_i$ in the above equation for Z(r)).

Figure 19:
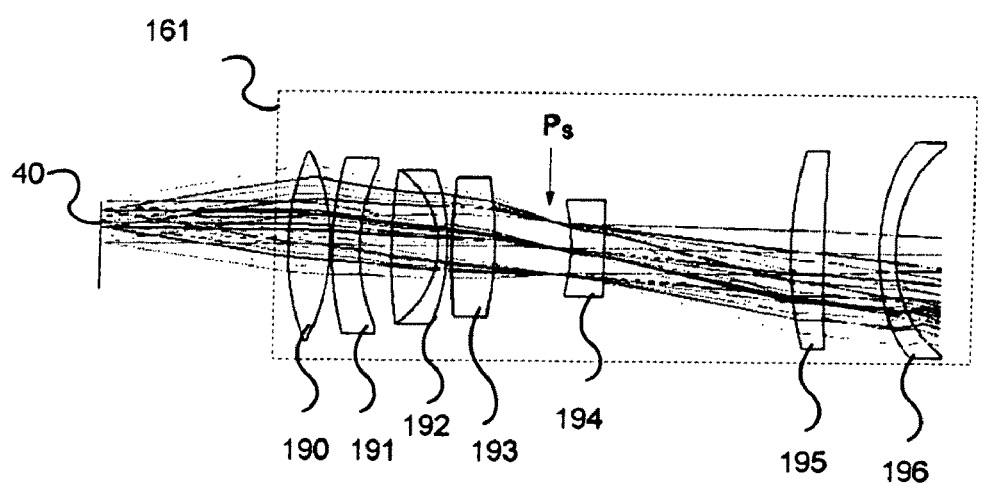
FIG. 19 shows an objective used in the projector of FIG. 16.

FIG. 19 shows the objective 161 in greater detail.

The objective 161 comprises a rear group of lenses 190 to 193 and a front group of lenses 194 to 196.

The last lens 196 of the objective 161 in the path of the imaging beam is preferably an aspheric meniscus lens, the shape of which is matched to the parameters of the concave mirror 164. Its shape is therefore preferably given by an aspheric surface equation as shown above.

As an illustration, in one particular embodiment the radius R of the concave mirror 164 is 60 mm, the parameters c and $a_1$ to $a_8$ are, respectively, the following: −1.59311 mm; 0; 0; −8.94×10$^{-6}$; 0; 1.64×10$^{-9}$; −9.74×10$^{-13}$; −7.84×10$^{-14}$; and 2.31×10$^{-16}$. The radius R of the first surface (the imager side) of the meniscus 196 is 44.94711 mm, and the parameters c and $a_1$ to $a_8$ have, respectively, the following values: 0; 0; 0; −3.1×10$^{-4}$; 2.88×10$^{-5}$; 1.96×10$^{-6}$; 7.14×10$^{-8}$; 4.15×10$^{-10}$; and 4.30×10$^{-10}$. The radius R of the second surface (opposed to the imager side) of the meniscus 196 is 29.49554 mm and the parameters c and $a_1$ to $a_8$ have, respectively, the following values: 0; 0; 0; −2.7×10$^{-4}$; 9.97×10$^{-6}$; 6.34×10$^{-7}$; −1.41×10$^{-7}$; 8.98×10$^{-9}$; and −1.78×10$^{-10}$.

The back-projector 16 has the advantage of a relatively small height h' below the screen, typically between 10 and 20 cm for a screen with a diagonal of about 1.50 m. The height h' is in fact sufficient to house the objective 161 and the mirror 164, while still forming a correct image on the screen 46 without the imaging beam 165 encountering the objective 161. Preferably, the height h' is equal to one fifth (approximately) of the height of the screen. More precisely, the height h' is less than or equal to the height of the screen divided by 5. It may also depend on the magnification of the objective 161 or of the concave mirror 164, and on the illumination system (the size of the lamp's reflector). Thus, for a projector with a 50″ screen and DMD HD3, the height h' is, for example, less than 20 cm and typically equal to 12 cm.

According to a variant of the invention, the axis of the objective 161 of the folded back projector 16 is not horizontal, the back-projector 16 comprising two or more folding mirrors positioned between the objective and the concave mirror 164 in order to send the beam in a direction approximately perpendicular, and preferably perpendicular, to the screen 46.

According to other embodiment variants of the invention, the axis of the imaging beam illuminating the concave mirror that is positioned after the first image in the path of the imaging beam is not horizontal. The shape of the concave mirror is then calculated so as to construct a second image on a projection plane corresponding to the projection screen.

The long side of the imager 40 of the back-projector 16 is vertical (for a vertical projection screen 46 with a long horizontal side).

The back-projector 16 makes it possible to eliminate the size constraint of the lenses of the objective 161 in order for it not to cut the return beam 165 from the mirror 164. Depending on the configuration of the back-projector 16, it is also possible to use larger lenses as they are below the beam 165 (easier separation of the fields).

Figure 17:
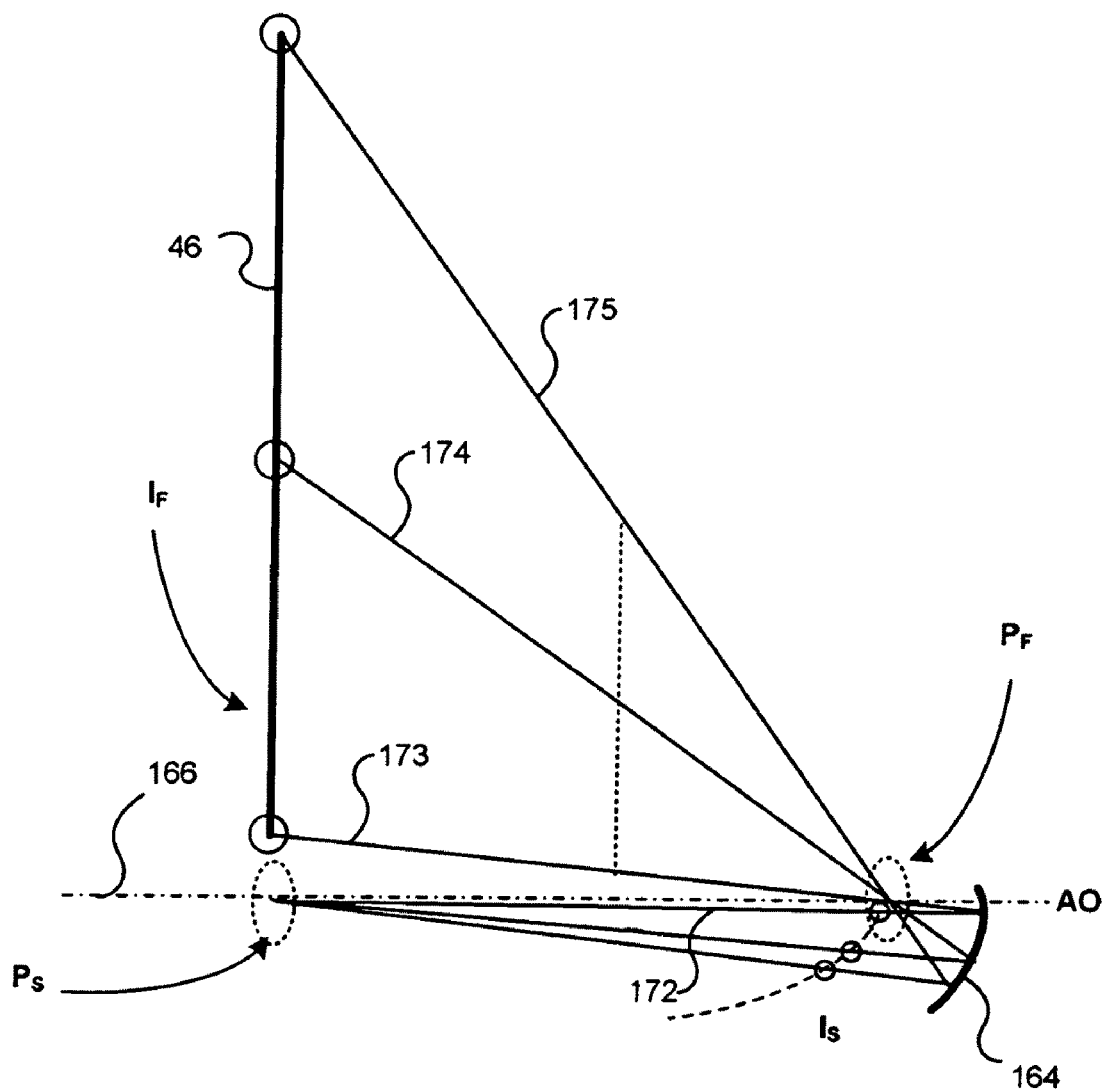
FIG. 17 shows the various images formed by the back-projector of FIG. 16.

FIG. 17 shows the various images formed by the back-projector 16 (the imaging beams being shown unfolded).

The ray 174 represents the central ray of the imaging beam 165 and the rays 173 and 175 are the two extreme rays.

The exit pupil $P_S$ of the objective 161 forms an image $I_S$ located in front of the mirror 164 in the path of the beam 165. The objective 161 magnifies the object image formed on the imager 40 in order to form the image $I_S$ with a magnification factor G. The magnification factor G associated with the objective 161 is preferably between 1 and 10, and even more preferably between 5 and 9.

The mirror 164 associates the exit pupil $P_S$ with a pupil $P_F$ where the rays of the imaging beam cross over in a relatively small area. The shape of the mirror 164 is calculated to create an image $I_F$ corresponding to the image $I_S$ projected on a projection plane where the screen 46 is located. The concave mirror 164 magnifies the image $I_S$ to form the image $I_F$ with a magnification factor G'. The magnification factor G' associated with the concave mirror 164 is preferably greater than the magnification factor G associated with the objective 161.

The use of a concave mirror 164 positioned after the first image in the path of said imaging beam has the advantage that the lower portion of the imaging beam corresponding to the ray 172 is relatively high and therefore allows optical elements close to the screen (in the case of a back-projector) to be housed more easily, without disturbing the propagation of the beams between the concave mirror and the screen.

According to an embodiment variant, the magnification factor G' associated with the concave mirror 164 is greater than 10.

The concave mirror 164 is preferably located below the optical axis. Preferably, the optical axis of the system in front of the concave mirror 164 is horizontal and close to the bottom of the screen 46.

Figure 18:
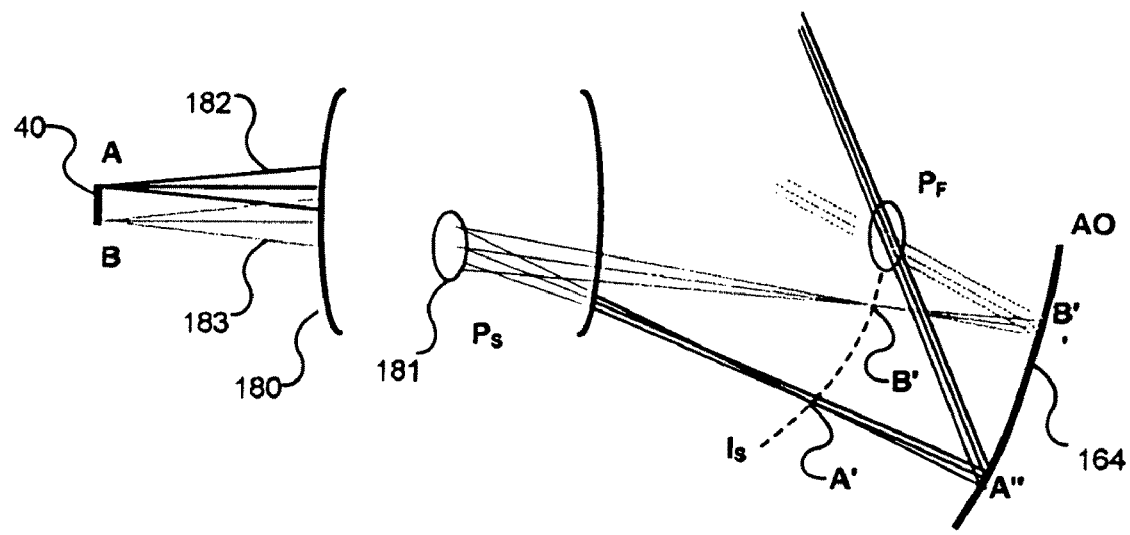
FIG. 18 illustrates the optical properties of the back-projector of FIG. 16.

FIG. 18 illustrates the optical properties of the back-projector 16. More precisely, the imager 40 creates a first image comprising two points A and B indicated by way of illustration. Emanating from these two points A and B are two beams 182 and 183, respectively, which form, after passing through the objective 161 comprising at least one lens 180 and an exit pupil $P_S$ 181, two points A' and B' belonging to the image $I_S$ created by the objective 161.

The beams 183 and 182 are reflected, respectively, in non-discrete regions A" and B" on the mirror 164 and converge on a region corresponding to the pupil $P_F$, the image of the pupil $P_S$ via the mirror 164.

It should be noted that the pupil $P_F$ is relatively close to the mirror 164 and that the pupil $P_S$ is further away from the mirror 164. Typically, the distance of the exit pupillary region $P_F$ from the vertex of the concave mirror 164 is between 25 mm and 60 mm. Preferably, the distance of the exit pupil 181 from the concave mirror 21 must be as large as possible.

Furthermore, a person skilled in the art will be able to define the objective and the concave folding mirror, which constructs a second image in a projection plane from a first image positioned in front of the concave mirror, in particular so as to adapt the corrections or astigmatisms and optical distortions according to particular criteria and to distribute them between the various optical components of the projection system.

According to an alternative embodiment of the invention, the projector 16 is equipped with a mask associated with at least one of the deflection mirrors 162 and 163 in order to prevent the propagation of the parasitic rays.

According to an alternative embodiment of the invention, the projector includes a pedestal similar to the pedestal 98, which may be relatively narrow (as described in FIG. 9) and includes optical elements similar to the elements of the projector 16 (especially a concave mirror), the optical axes of which correspond to those illustrated in the projector 9 for the corresponding elements (especially the angle γ1 that the axis of the objective makes with the screen, this angle preferably not exceeding 25°).

According to an alternative embodiment of the invention, the projector is of the front projector type using a concave curved mirror. Thus, such a projector comprises, for example, the elements of the projector 16, except for the folding mirror located after the concave mirror and the screen, in a configuration similar to that of the projector 16 in the case of the elements of the optical motor and of the folding mirrors and to that of the projector illustrated in FIG. 12 in the case of the parts specific to the front projection.

Of course, the invention is not limited to the embodiments described above.

In particular, the back-projector according to the invention includes a curved mirror, which may especially be an aspheric or hyperbolic mirror in order to magnify the beam.

The curved mirror is especially a concave or convex mirror. The invention is also compatible with a partly concave or convex curved mirror (for example, a mirror with a concave portion and a convex portion, or a mirror with a plane portion and a concave or convex portion, or a mirror with a plane portion, a concave portion and a convex portion).

The invention applies to any projector of small overall size, especially in the case in which a lateral part is placed beside, above or below the screen, which part contains optical elements.

The plane deflection surfaces located between the objective and the convex mirror, or between the lamp and the image, may, according to the invention, be of any type and, in particular, may be reflecting or semi-reflecting surfaces of the mirror type or prisms with a reflecting face.

The number and the positioning of the reflecting or semi-reflecting deflection surfaces placed in the path of the imaging beam between the objective and the convex mirror are not limited to the embodiments described above either. Thus, according to the invention, there may be two or more, especially two, three or four, deflection surfaces placed in the path of the imaging beam between the optical system and the convex mirror. Thus, according to the invention, embodiments may involve three, four or even more deflection surfaces for redirecting the imaging beam in various planes not perpendicular to the screen (for example in a configuration in which the objective is placed so as to be approximately vertical to a lateral part of the projector, a first reflecting surface sending the imaging beam horizontally to a second reflecting surface, which sends the beam vertically to a third deflection surface, which redirects the beam to a convex mirror).

Likewise, the number and the positioning of the reflecting or semi-reflecting deflection surfaces (especially mirrors or prisms with a reflecting face) that are placed in the path of the illumination beam between the illumination source and the imager are not limited to the embodiments described above either. Thus, according to the invention, there may be two or more, especially two, three or four, deflection surfaces placed in the path of the illumination beam between the illumination source and the imager. Thus, according to the invention, embodiments may involve three, four or even more deflection surfaces for redirecting the illumination beam onto the imager.

The invention claimed is:

1. Projection system, comprising:
    an illumination means that generates an illumination beam;
    an imager that creates an imaging beam from the illumination beam, the imaging beam being representative of an image;
    a projection module intended to project the image on a screen defining a specified projection plane, said module comprising:
       an objective for refracting the imaging beam, having a refractive portion comprising lenses; and
       a curved mirror for deflecting the imaging beam, which is located below the optical axis of the objective,
       at least two plane deflection surfaces for deflecting the imaging beam emanating from the objective, these plane surfaces being placed in the path of the imaging beam between the objective and the curved mirror,
    wherein the curved mirror is:
       either a hyperbolic mirror which is placed on the exit side of the objective in such a way that the axis of the hyperbola passing through the foci of the hyperbola coincides with the optical axis the objective, or
       an aspheric mirror having an axisymmetric shape defining an optical axis that coincides with the optical axis of the objective.

2. Projection system according to claim 1, wherein the projection system comprises a projection screen, the projection module illuminating the projection screen via the rear.

3. Projection system according to claim 1, wherein the angle between the optical axis of the objective and the projection plane does not exceed 10°.

4. Projection system according to claim 3, wherein, when the projected image is rectangular, the angle between the optical axis of the objective and the long side of the image projected on the screen does not exceed 10°.

5. Projection system according to claim 3, wherein, when the projected image is rectangular, the angle between the optical axis of the objective and the short side of the image projected on the screen does not exceed 25°.

* * * * *